(12) United States Patent
Pau et al.

(10) Patent No.: US 12,478,705 B2
(45) Date of Patent: Nov. 25, 2025

(54) HIGH PERFORMANCE ULTRAVIOLET DISINFECTION IN A HEATING, VENTILATION, AND AIR CONDITIONING SYSTEM WITH INTEGRATED CONCENTRATOR OPTICS

(71) Applicant: Arizona Board of Regents on Behalf of the University of Arizona, Tucson, AZ (US)

(72) Inventors: Stanley Pau, Tucson, AZ (US); Richard John Koshel, Tucson, AZ (US); Linan Jiang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 391 days.

(21) Appl. No.: 18/043,294

(22) PCT Filed: Aug. 25, 2021

(86) PCT No.: PCT/US2021/047503
§ 371 (c)(1),
(2) Date: Feb. 27, 2023

(87) PCT Pub. No.: WO2022/046874
PCT Pub. Date: Mar. 3, 2022

(65) Prior Publication Data
US 2024/0009340 A1    Jan. 11, 2024

Related U.S. Application Data

(60) Provisional application No. 63/071,063, filed on Aug. 27, 2020.

(51) Int. Cl.
*A61L 9/20* (2006.01)
*F24F 8/22* (2021.01)

(52) U.S. Cl.
CPC .................. *A61L 9/20* (2013.01); *F24F 8/22* (2021.01); *A61L 2209/12* (2013.01); *A61L 2209/16* (2013.01)

(58) Field of Classification Search
None
See application file for complete search history.

(56) References Cited

U.S. PATENT DOCUMENTS

| 4,917,862 A | 4/1990 | Kraw et al. |
| 5,505,904 A | 4/1996 | Haidinger et al. |

(Continued)

FOREIGN PATENT DOCUMENTS

RO    118844 B1 * 12/2003

OTHER PUBLICATIONS

Ultraviolet air and surface treatment, ASHRAE Handbook Ch. 62.
(Continued)

*Primary Examiner* — Andrew Smyth
(74) *Attorney, Agent, or Firm* — Perkins Coie LLP

(57) ABSTRACT

Methods, apparatus and systems that relate to high performance UV disinfection in a HVAC system with integrated concentrator optics are described. One example device for air disinfection includes a housing structured to include an interior volume and having an air inlet at a first end of the housing and an air outlet at a second end of the housing, the housing providing an air passage through the interior volume between the air inlet and the air outlet. The device filter includes at least one light source positioned proximate to the interior volume and at least one nonimaging optics element positioned proximate to the interior volume.

22 Claims, 26 Drawing Sheets

(56) References Cited

U.S. PATENT DOCUMENTS

| | | | |
|---|---|---|---|
| 6,022,511 | A | 2/2000 | Matschke |
| 6,555,011 | B1 * | 4/2003 | Tribelsky ................ A61L 2/232 |
| | | | 210/255 |
| 9,878,064 | B2 * | 1/2018 | Nagolkin .................. A61L 9/22 |
| 2011/0139999 | A1 * | 6/2011 | Clark ...................... A61L 9/205 |
| | | | 250/435 |
| 2012/0315184 | A1 * | 12/2012 | Clark ....................... A61L 9/20 |
| | | | 422/4 |
| 2013/0340460 | A1 | 12/2013 | Andros et al. |

OTHER PUBLICATIONS

Ultraviolet lamp systems, ASHRAE Handbook Ch. 17.
International Search Report and Written Opinion mailed Dec. 13, 2021 for International Patent Application No. PCT/US21/47503 (17 pages).
Kneissl, Michael, et al., T. Y. Seong, J. Han and H. Amano, "The emergence and prospects of deep-ultraviolet light-emitting diode technologies," Nature Photonics, vol. 13, p. 233-244, Apr. 2019.
ANSI/ASHRAE Standard 62.Jan. 2019, Ventilation for Acceptable Indoor Air Quality, 2019.
Koshel, R. J., Illumination Engineering: Design with Nonimaging Optics, IEEE Press, Ch. 2, 4, and 7, 2013.

* cited by examiner

HIGH PERFORMANCE ULTRAVIOLET DISINFECTION IN A HEATING, VENTILATION, AND AIR CONDITIONING SYSTEM WITH INTEGRATED CONCENTRATOR OPTICS

CROSS REFERENCE TO RELATED APPLICATIONS

This patent document is a 371 National Phase Application of International Patent Application No. PCT/US2021/047503, filed Aug. 25, 2021, which claims priority to the provisional application with Ser. No. 63/071,063, titled "HIGH PERFORMANCE UV DISINFECTION IN A HVAC SYSTEM WITH INTEGRATED CONCENTRATOR OPTICS", filed on Aug. 27, 2020. The entire contents of the above-noted applications are incorporated by reference as part of the disclosure of this document.

TECHNICAL FIELD

The disclosed technology relates generally to devices and methods for air disinfection and, more specifically, to methods, devices and systems for air disinfection in heating and air conditioning systems, according to some embodiments.

BACKGROUND

Disinfection of air can be performed by using, for example, an air filter, alternating electrostatic fields, ozone, or ultraviolet radiation. Air cleaning or disinfection can lead to removal or neutralization of airborne pathogens from air inside a hospital, a classroom, a restaurant, a nursing home or a store and can lead to reduced odor, reduced allergy reactions, as well as reduced transmission of infectious diseases. However, current systems fail to provide simple and yet effective air disinfection solution that can also be implemented as part of an existing heating, ventilation, and air conditioning (HVAC) system.

SUMMARY OF CERTAIN EMBODIMENTS

The techniques disclosed herein can be implemented in various embodiments to achieve high-performance ultraviolet (UV) disinfection in a heating, ventilation, and air conditioning (HVAC) system with integrated concentrator optics.

An aspect of the disclosed embodiments relates to a device for air disinfection that includes a housing structured to include an interior volume and having an air inlet at a first end of the housing and an air outlet at a second end of the housing, the housing allowing an air flow through the interior volume between the air inlet and the air outlet. The device also includes at least one light source positioned proximate to the interior volume and operable to emit radiation in an ultraviolet range of wavelengths. The device further includes at least one non-imaging optical element positioned proximate to the interior volume. Furthermore, the device is such that the at least one non-imaging optical element is configured to form an optical cavity in at least a part of the interior volume to confine the radiation provided by the at least one light source within the optical cavity, and one or more of a shape of the at least one non-imaging optical element, or emission profile of the radiation from the at least one light source are selected or designed to produce a substantially spatially uniform distribution of the radiation in a cross section of the optical cavity.

Another aspect of the disclosed embodiments relates to a method of designing an air disinfection system for an enclosure that includes obtaining one or more air disinfection units, each air disinfection unit comprising: a housing structured to include an interior volume and having an air inlet at a first end of the housing and an air outlet at a second end of the housing, the housing enabling an air flow through the interior volume between the air inlet and the air outlet; at least one light source positioned proximate to the interior volume and operable to emit radiation in an ultraviolet range of wavelengths; and at least one non-imaging optical element positioned proximate to the interior volume; wherein the at least one non-imaging optical element is configured to form an optical cavity in at least a part of the interior volume to receive the radiation from the at least one light source and to confine the radiation within the optical cavity, and one or more of a shape of the at least one non-imaging optical element, or emission profile of the radiation from the at least one light source are selected or designed to produce a substantially spatially uniform distribution of the radiation in a cross section of the optical cavity. The method also includes configuring and/or positioning each of the one or more air disinfection units within the enclosure to provide a substantially uniform air flow within substantially an entirety of the enclosure at a desired air flow rate.

DETAILED DESCRIPTION

Removal or neutralization of airborne pathogens from air inside a room or facility, such as a hospital, classroom, restaurant, nursing home or store can reduce odor, allergy reactions and transmission of infectious diseases. Disinfection of air can be carried out in a variety of ways, for example by using an air filter, alternating electrostatic fields, ozone, or ultraviolet radiation. Among the many techniques, ultraviolet germicidal irradiation (UVGI) which utilizes ultraviolet C (UVC) light with optimal wavelength at around 265 nm in combination with an air filter is the most common. The ideal UVGI system should have low power consumption and maintenance, high sterilization and flow rates, be flexible and, for the ease of implementation in some applications, have a small form factor that is also preferably compatible with existing infrastructure. The system should also be safe and be able to effectively sterilize the air inside a room, with or without an occupant, in a short amount of time, without disturbing the environment inside the room too much. However, the existing UVGI systems do not possess many of the above mentioned characteristics and, therefore, the need to develop a better system for UV based air disinfection that could be used with heating ventilation, and air conditioning (HVAC) systems or as a standalone system still exists.

Figure 1A:
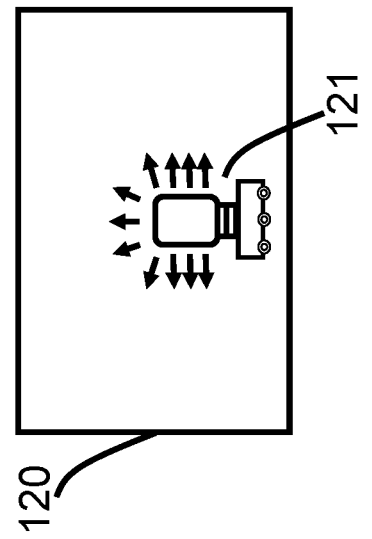
FIGS. 1A-1E illustrate example types of ultraviolet germicidal irradiation (UVGI) systems that can be implemented inside a room in accordance with the disclosed technology.
Figure 1B:
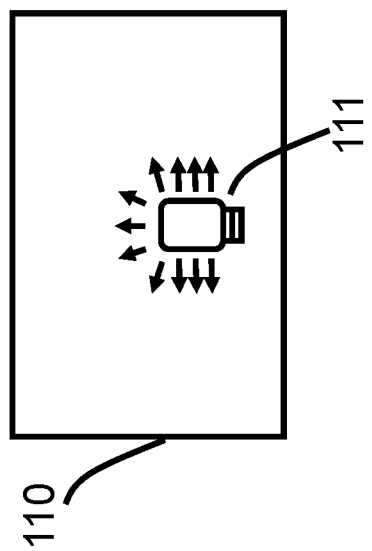
Figure 1C:
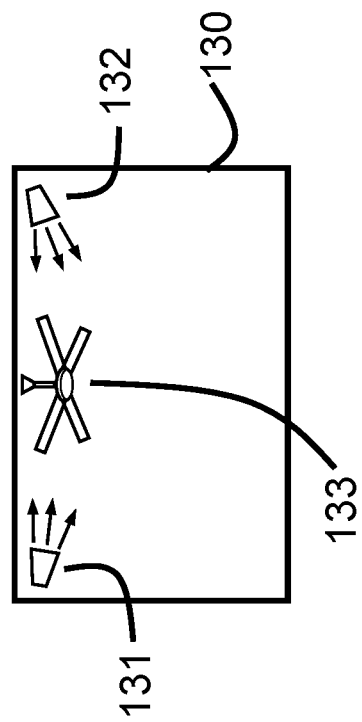

The techniques disclosed herein can be implemented in various embodiments to, among other features and benefits, achieve high-performance UV disinfection in a HVAC system with integrated concentrator optics. FIGS. 1A-1C shows example types of UVGI systems that can be implemented inside a room. The simplest configuration is shown in FIG. 1A where a single UVC light source, 111, is utilized to illuminate the entire room 110. The light source 111 can be fixed or portable. FIG. 1B shows another configuration where a light source is mounted on an autonomous vehicle, 121, which can be turned on and off and can navigate inside the room 120. The autonomous vehicle is shown to be moving on the floor, but it can also be positioned, for example, on a rail on the ceiling or a wall of the room 120, or on a drone that moves within the room. FIG. 1C shows multiple light sources, e.g., 131 and 132, mounted on the ceiling of a room 130. In some implementations, the light sources are positioned to illuminate predominantly or exclusively a top part of the room 130, i.e., the part of the room proximate to its ceiling. A fan 133 can be utilized to create air circulation in the room 130, e.g., an air flow from the bottom of the room 130 to the top of the room 130, where the irradiation of the air by the light sources 131 and 132 takes place. This upper-air UVC system illustrated in FIG. 1C performs disinfection above the heads of the room occupants and tends to have a low UVC flux and a low air flow rate, resulting in ventilation of 2 to 6 air changes per hour (ACH). FIG. 1D shows another ventilation system which includes a light source 141, an optical cavity or chamber 142, and two fans, 143 and 144, located inside a room 140. Airflow created by the fans 143 and 144 flows into the optical cavity 142, which contains UVC radiation created by the light source 141. Optical cavity 142 can be a part of an in-duct UVGI system, for example. The purpose of the optical cavity shown in FIG. 1D is to confine the light and increase the irradiance of air going through the cavity. A properly designed cavity can increase the UVC flux by, e.g., a factor of between 5 and 100. Typical irradiance for an in-duct system ranges from $10^3$ to $10^4$ $\mu W/cm^2$. The cavity 142 is typically coated with a material that diffusely reflects UVC radiation.

Figure 1E:
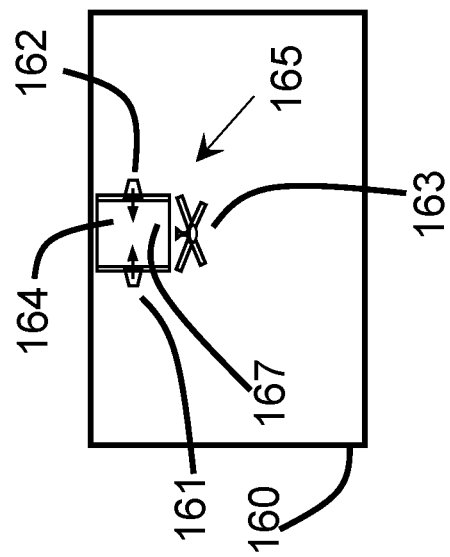
Figure 1D:
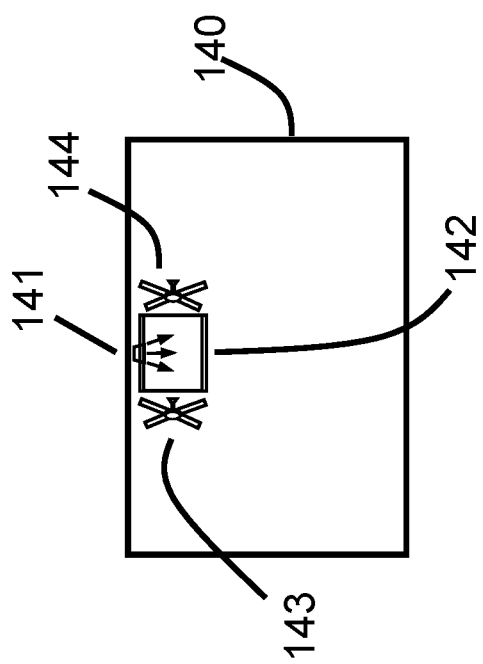

FIG. 1E shows a room 160 with an example UVGI system 165 according to an example embodiment of the disclosed technology. The example UVGI system 165 includes light sources 161 and 162, with non-imaging optics, a fan 163, and a duct or housing 164. Note that only one light source (e.g., 161) can be used in some implementations of the system 165. For example, the light source can be surrounded by reflective optical elements on multiple sides. The purpose of the non-imaging optics working in cooperation with the light sources 161 and/or 162 of the system 165 is to concentrate the UVC flux produced by the light sources 161 and/or 162 and to form an optical cavity to confine the UV radiation produced by the light sources 161 and/or 162. As such, the non-imaging optics of the system 165 can be referred to as a non-imaging concentrator.

Examples of non-imaging optical components include mirrors (e.g., flat, spherical or aspherical), gratings, or other components that provide high reflectivity at the desired UV wavelengths. Generally, non-imaging optics include all forms of optics including, for example, refractive, reflective, total internal reflection (TIR), and so forth. Also, hybrid non-imaging optics designs that combine several of these phenomena in a single optic can be used. For reflective concentrators, their shapes (and/or shapes of their elements) run the gamut of flat, spherical, aspherical, conics, freeform, and many other shapes based, e.g., on design methods.

Notably, in selecting or designing the non-imaging optics, image quality considerations such as aberrations are not a factor, but rather the non-imaging components are designed or selected to provide the desired fluence and uniformity of illumination in conjunction with the light sources. In contrast to the system illustrated in FIG. 1D, for example, in which the optical cavity 142 is coated with a material that diffusely reflects UVC radiation, the non-imaging optics in the system 165 according to an example embodiment of the disclosed technology utilizes mirrors that specularly reflect UVC light. In some implementations, the reflection can occur due to total internal reflection (TIR), or via diffraction. The shapes of the non-imaging optics elements of the system 165, as well as the shapes of the light sources 161 and 162 along with the spatial (e.g., angular) emission profiles of the light sources can be tailored to produce a desired and substantially spatially uniform distribution of the UVC radiation within at least a part of the inner volume 167 of the duct 164 which forms the optical cavity. A spatial uniformity of the UVC radiation in the duct 164 can be characterized, for example, using such radiation characteristics and measures as energy density, radiance or any other suitable characteristic or measure.

Having a substantially spatially uniform irradiation and the proper airflow produced by the fan 163 ensures that the inner volume 167 of the duct 164 does not have "blind spots" through which contaminated air can escape from the system. Creating a spatially uniform distribution profile of the UVC radiation in the interior volume 167 of the duct 164 will also help to ensure that all elements of the volume receive a desired dose of the UVC radiation sufficient for air disinfection in an energy-efficient way. It should be noted that for the purposes of illustration and not by limitation, the example system shown in FIG. 1E is described in the context of a "duct" in a room. But is it understood that the disclosed technology is applicable, and can be implemented, in a confined space or volume, that is illuminated by the disclosed light sources and includes proper ventilation to circulate the sterilized or disinfected volume of air. As such, the disclosed technology can be implemented in fixed-in-place or portable units that can be implemented in rooms, cabins, vehicles, aircraft, ships, hospitals, classrooms and elsewhere to provide a desired level of decontamination.

Referring back to FIG. 1E, for effective disinfection, one should consider the dose of the radiation received by a given volume of air passing through the system. That volume of air can be, for example, a part of the airflow created by the fan 163. The dose of the UVC radiation that a unit volume of the airflow will receive inside the system 165 is proportional to a residence time of the airflow volume inside the system. If all parts of the airflow move through the system 165 at the same speed, and travel the same length inside the system, then the residence time of any element of the airflow inside the system will be the same. If different parts of the airflow move with different speeds and/or have different lengths of travel inside the system, then those parts will have different residence times inside. Accordingly, one can take distributions of the flow velocities and/or path length within the duct 164 into account in order to tailor the UVC illumination optics of the system 165, including the light sources and non-imaging optics elements, to provide an optimal disinfection dose of UVC radiation for all elements of the airflow. Alternatively, or in addition to tailoring the non-imaging optics of the system, the flow of air inside the duct 164 can be shaped to ensure that, for example, it is concentrated in the region of the optical cavity created using the non-imaging optics of the system and has velocities compatible with achieving the required degree of air disinfection.

In the example in-duct UVGI system 165 shown in FIG. 1E, air flows inside the duct 164 along a path through concentrated UVC radiation, resulting in efficient and rapid air sterilization. The dimensions, output power, and other characteristics of the light sources and non-imaging optics of the system can be designed to be compact and modular, such that they can be inserted into an existing ventilation system in an apartment, office building or on a plane, or used as a standalone system with a compact footprint.

The increase in UVC flux permits the concomitant increase of the air flow rate inside the system without decreasing the air disinfection quality, thus allowing a much faster air turnover rate inside the room. In a conventional air disinfection system, the pathogens are irradiated over a large volume chamber and during long irradiation times. In a concentrated optical system according to the disclosed technology, the pathogens are irradiated with higher intensity radiation over a shorter time, and, in some implementations, within a smaller volume. A proper optical design reduces the interaction volume and exposure time of the flowing pathogens and also minimizes any stray light leaking out of the system. The design of the non-imaging optics of the system is tailored to maximize total fluence along the paths of air. In some example embodiments of the UVGI air disinfection system, the path of air is roughly perpendicular to the path of light within the optical cavity created by the light sources and non-imaging optics elements of the system (or roughly perpendicular to a direction of light injection from the light sources into the optical cavity), although other configurations of the airflow and light paths are possible. The example designs of the non-imaging optics of the UVGI air disinfection system according to the disclosed technology allow maximizing the distribution of light inside the optical cavity.

An increase of the equivalent air change per hour (ACH) to more than 10 is desirable for many applications. Currently, the most efficient sources of UVC light for UVGI systems are low-pressure mercury discharge lamps, with about 85% of the energy at 253.7 nm (which is close to the 265 nm optimal wavelength for inactivation of microorganisms). It has been shown that a dose of about 25,000 $\mu$W-s/cm$^2$ per log of kill is needed to inactivate *Bacillus subtilis* endospores at 254 nm. For 6 log kill, a dose of 150,000 $\mu$W-s/cm$^2$ is typically more than enough to kill other viruses and bacteria, such as influenza A, *Mycobacterium tuberculosis* and *Escherichia coli*.

State-of-the-art UVC light-emitting diodes (LED) currently have about 6% efficiency and 10,000 hours lifetime, compared to a typical mercury lamp which has about 30-40% efficiency and 9,000 hours lifetime. UVC LED, however, is catching up fast and is anticipated to have a similar efficiency as the mercury lamp within 10 years. UVC LED also has many additional advantages over the mercury lamp, including longer lifetime, environmentally friendly disposal, and compact and flexible geometry. Non-imaging optical designs that are otherwise difficult or not possible to implement when using conventional lamp sources can be implemented by fully taking advantage of the light distribution and shape of UVC LEDs. The disclosed UVGI air disinfection systems can thus utilize both mercury lamps and light-emitting diodes or other types of solid-state light emitting elements, such as solid-state UV lasers, to implement the light sources of the systems.

Figure 2:
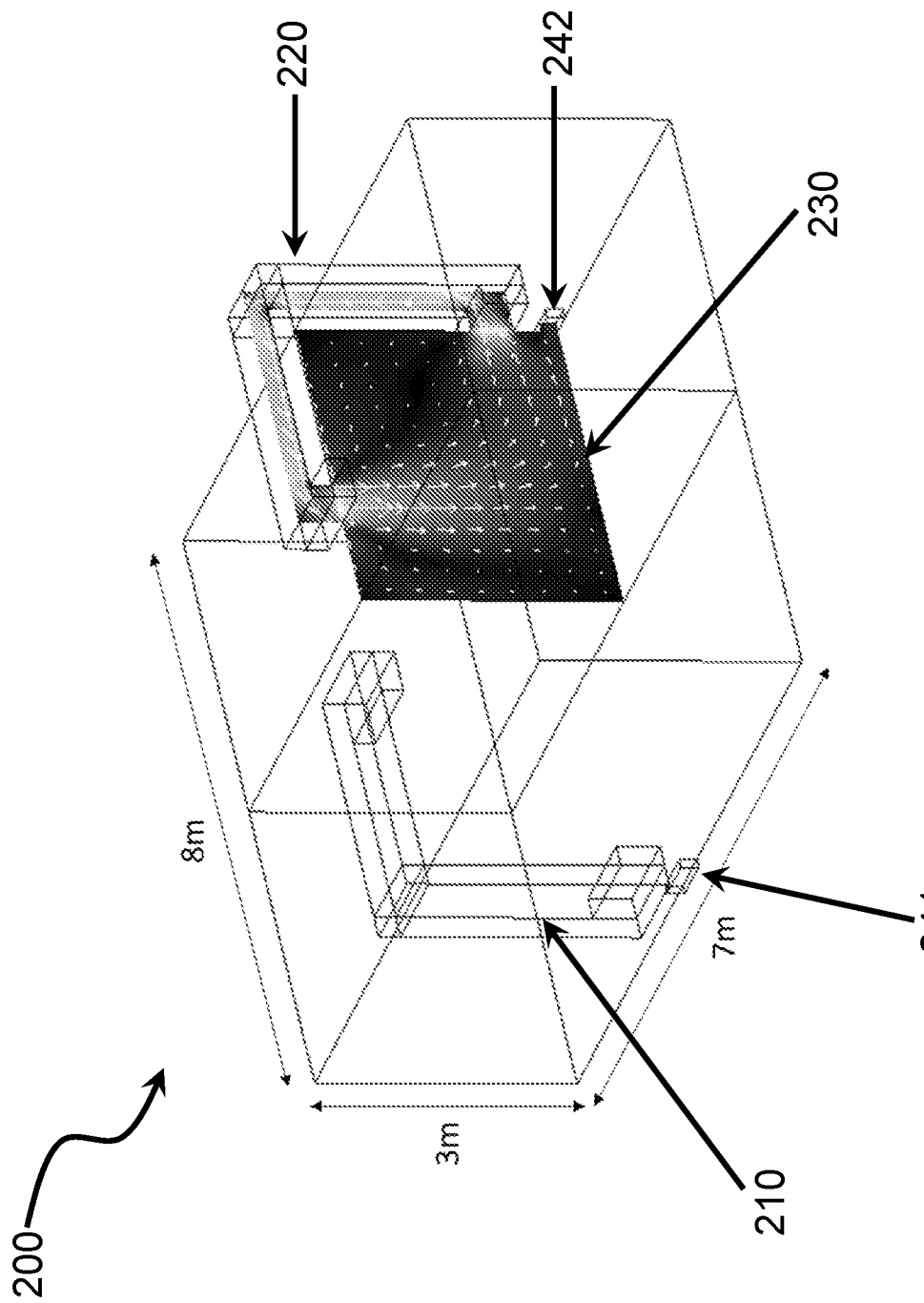
FIG. 2 illustrates example results of air ventilation simulation for a room equipped with two air handling units (AHUs).

FIG. 2 illustrates example results of an air ventilation simulation for a room 200 having dimensions of 7 m×8 m×3 m and including two identical ducts of air handling units (AHUs) 210 and 220. Each of the ducts, with its supply and return openings connected to the room, has a uniform cross-sectional area of 1 m×0.5 m for air flow. Air flow rate of 0.25 m$^3$/sec for each of the two units provides an air change per hour (ACH) of 10 for the room. The air flow inside the room is unidirectional and laminar. The air flow velocity magnitude in the vertical plane at the middle of the room is presented in a grey-scale map 230, whereas color change from white to black represents transition from high to low velocities. Air flow velocity is below 0.3 m/sec in most locations in the room, and the estimated noise due to the air flow alone is less than 5 dB. These air flow characteristics meet and exceed ventilation standards for general room settings in schools and universities, such as classrooms, lecture halls, laboratories, and conference/meeting rooms, as recommended for the HVAC systems by American Society of Heating, Refrigerating and Air-Conditioning Engineers (ASHRAE). The air ports 241 and 242 shown in FIG. 2 are designed to facilitate air exchange between the room 200 and other rooms and/or spaces surrounding the room 200.

The air flow, exposed for 1.5 sec to the UVC radiation produced by the UVGI system with a power density of $10^5$ $\mu w/cm^2$, receives a UVC dose of 150,000 $\mu W \cdot s/cm^2$, sufficient for air disinfection from most viruses and bacteria in it. The travel distance of the air flow in the duct 220 shown in FIG. 2 is estimated to be 0.675 m in 1.5 sec for the air flow rate indicated above. Therefore, the UVGI system should be designed to provide a UV radiation covering enough distance along the duct (e.g., about 0.675 m) with similar cross-sectional dimensions to those of the duct.

A UVGI system according to the disclosed technology can be integrated inside a duct of an air handling unit in a HVAC system along the air flow path in the duct. For example, a UVGI system according to the disclosed technology can be attached to or otherwise integrated with a duct of the air handling unit of the HVAC system proximate to the air intake opening of the duct and/or proximate to the air exit opening of the duct. The UVGI system can provide a part of its air flow, or all of its air flow, to the HVAC system and/or receive the air from the exit flow of the air handling unit for disinfection. In the latter case, the system can also intake air from the room.

Figure 3B:
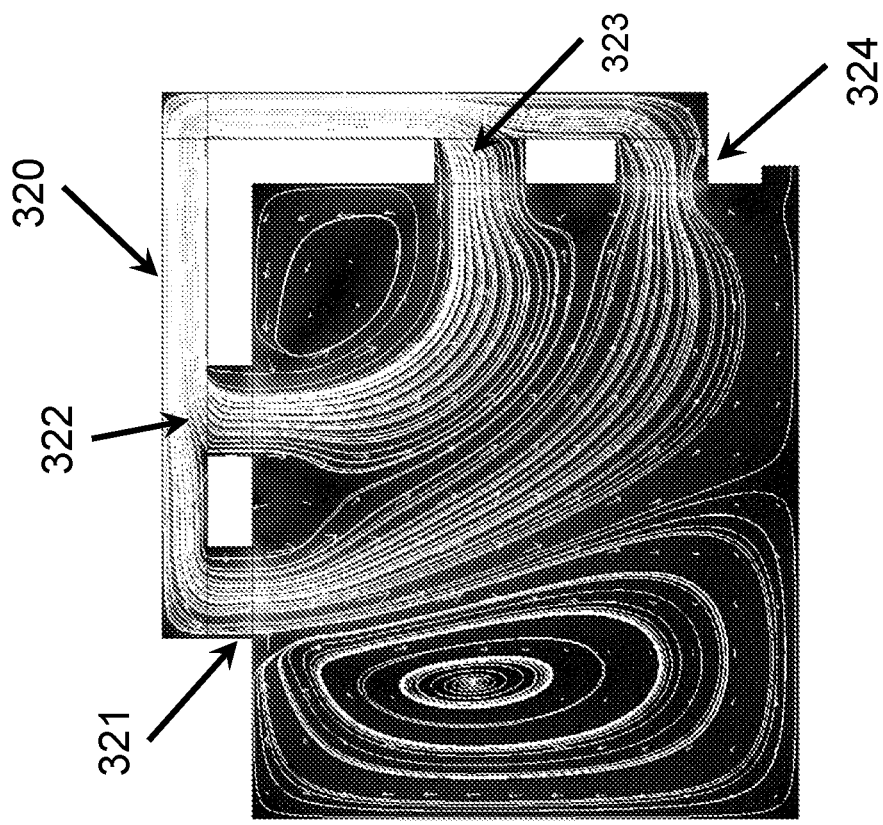
FIGS. 3A and 3B show example 2D simulation results for air flow paths for different arrangements of air handling unit (AHU) supply and return openings.
Figure 3A:
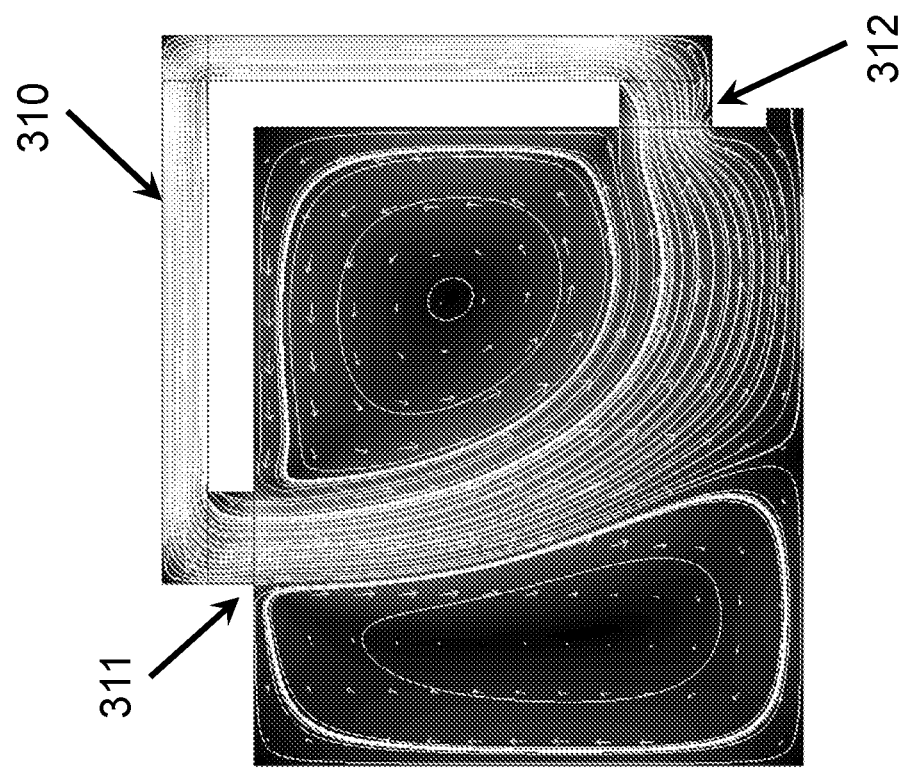

The number and position of each AHU inside a room can be determined based on the size and geometry of the room. It is important to generate unidirectional flow and reduce the presence of vortices inside the room by, for example, properly arranging the locations of the AHU supply and/or return openings. FIGS. 3A and 3B show two-dimensional (2D) simulation results of air flow paths in the same room 200 shown in FIG. 2 for different arrangements of AHU supply and return openings. As shown in FIG. 3A, AHU 310 includes an air exit opening 311 and an air intake opening 312. The AHU 320 shown in FIG. 3B includes two air exit openings 321 and 322, as well as two air intake openings 323 and 324. It should be noted that the convention used in these figures refers to the vents that supply the fresh air/UV treated air (clean air flow comes from AHU into the room) as the exit openings and the ones at the sidewalls that collect the air in the room to the AHU for treatment as the intake openings. Each of the AHUs 310 and 320 can include a UVGI air disinfection system according to the disclosed technology. Air velocity contours shown by white lines in FIGS. 3A and 3B are drawn tangential to the directions of the air flow velocity at the contour points. Existence of closed air velocity contours in a room, as shown in FIG. 3A, for example, indicates that air predominantly recirculates within those contours, creating air vortices that move without going through the air ventilation system which is an undesirable situation. With a single pair of supply/return openings, as shown in FIG. 3A, large vortices are present that trap the air in them. The vortices can be broken down and reduced by modification of the AHU supply/return openings arrangement as shown in FIG. 3B, for example. As shown in FIG. 3B, addition of a second pair of AHU supply and return openings practically eliminates the air vortices in the upper-right area of the room. As shown in FIGS. 2 and 3A-3B, the number of air handling units, the position of each AHU inside a room, the number of the supply and return openings of each AHU, as well as the position of each of the supply/return openings along the duct of the AHU, can be selected to minimize or eliminate air vortices inside the room. Other parameters that can be used to minimize air vortices in a room include the magnitude and direction of the air flow in each of the ducts, as well as the cross-sectional dimension and length of each of the ducts.

The air handling units shown in FIGS. 2, 3A, and 3B can be a part of a HVAC system that provides ventilation and air conditioning for the room shown in those figures. Alternatively, in some embodiments, the UVGI air disinfection systems can include their own air duct or multiple air ducts and can provide their own fan or multiple fans (or any other means of creating an airflow inside the ducts) to create an air flow inside the ducts. Such systems can be used as stand-alone systems or can be coupled to an HVAC system and can supply a part of their air flow (or all of their air flow) to the HVAC system or intake it from the HVAC system. In this way, the UVGI air disinfection system according to the disclosed technology can remain operational even when the HVAC system is turned off. In some implementations, the light sources and non-imaging optics elements of the air disinfection system according to the disclosed technology are incorporated inside a housing that is attached to, inserted in or otherwise incorporated with an air duct of the system; the airflow inside the duct can be created using, e.g., one or more fans the can be a part of the system. In some embodiments, the air flow inside the housing passes through an optical cavity produced by the optics elements and light sources of the system. In some implementations, an axis of the optical cavity is oriented substantially perpendicular to the direction of the air flow. In some embodiments of the system, some of the light sources and/or elements of the non-imaging optics of the system are located outside the inner volume of the air duct of the system and are in a radiation contact with at least a part of that volume in order to deliver UVC radiation into it.

Figure 4:
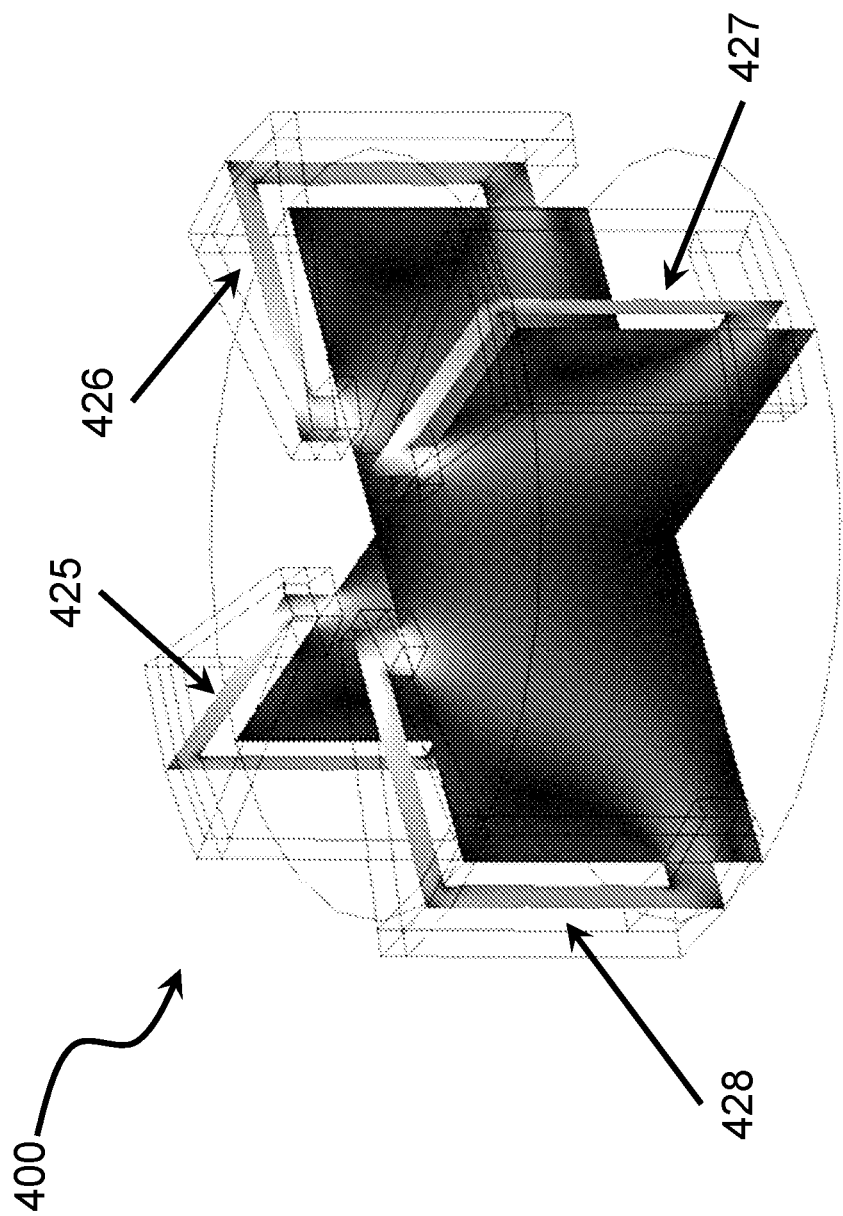
FIG. 4 illustrates four UVGI air disinfection systems that are positioned in a room according to an example embodiment of the disclosed technology.

FIG. 4 shows a room 400 provided with four UVGI air disinfection systems 425, 426, 427, and 428 according to an example embodiment of the disclosed technology. The systems 425, 426, 427, and 428 can be controlled and operated independently from each other. The shades of gray in FIG. 4 illustrate the distribution of the air flow velocity amplitudes inside the room as well as inside the ducts of the systems 425, 426, 427, and 428. As evident from FIG. 4, the airflow velocity is substantially uniform throughout the room, with expected deviations within the ducts and at the supply/return openings. Each of the systems 425, 426, 427, and 428 shown in FIG. 4 can be constructed using a few standard units, such that the total length of the system is adjustable. This provides the capability to adjust positions of the air supply and return openings of the duct of the system which can be used to engineer a desirable air flow pattern inside the room. Multiple independent UVGI air disinfection systems according to the disclosed technology can be provided for one room, as, for example, shown in FIG. 4. Alternatively, a single system can be provided for a room. The UVGI systems can be installed, for example, outside of the room (e.g., above room's ceiling, below room's floor and/or behind walls of the room); they can also be placed inside the room provided there is no appreciable leak of UV radiation into the room. The air flow through a UVGI system according to the disclosed technology can be generated using, e.g., an electric motor coupled to a fan located, for example, at the air inlet or at the air outlet of the system duct. According to some example embodiments, air flow rate and system dimensions, including those of the system's air duct can be adjusted to achieve sufficient and efficient UV treatment of air inside the system.

Figure 5B:
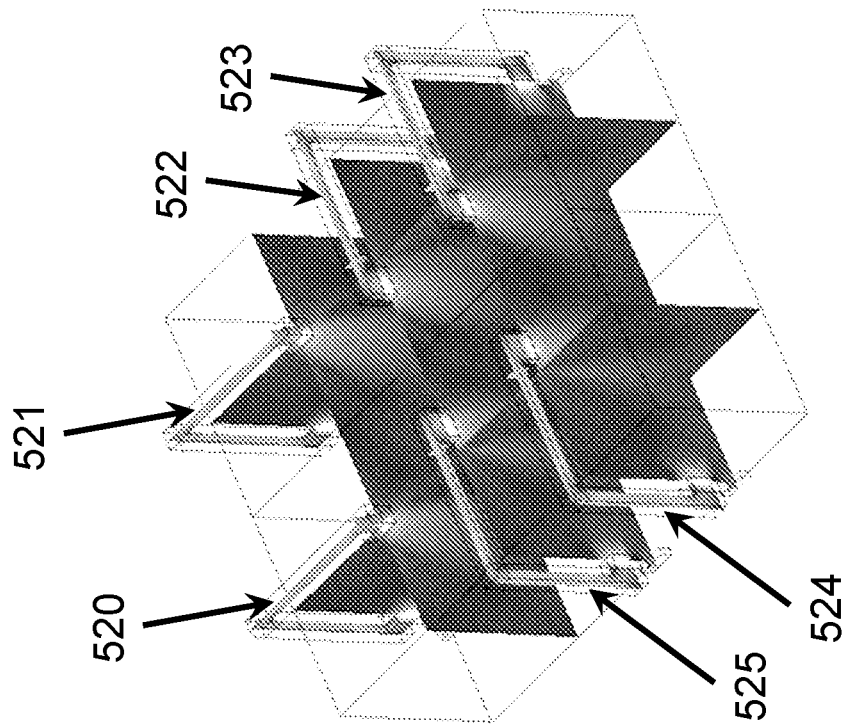
FIGS. 5A and 5B illustrate different arrangements of six instances of a UVGI air disinfection system according to example embodiments of the disclosed technology.
Figure 5A:
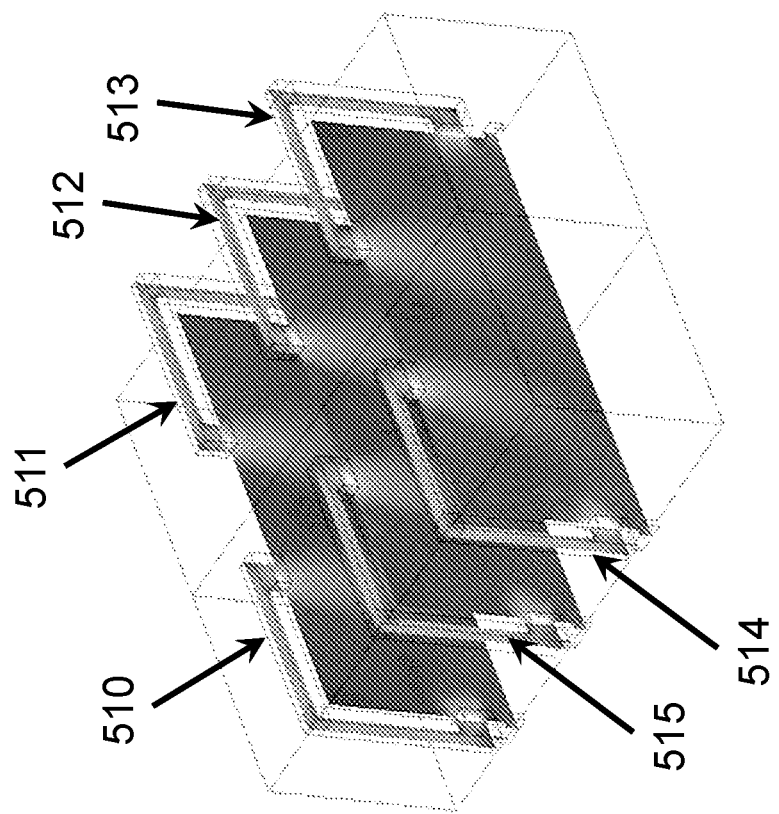

FIGS. 5A and 5B illustrate two rooms equipped with two different arrangements or configurations of six independent air flow/UV instances of an UVGI air disinfection system according to an example embodiment of the disclosed technology. FIGS. 5A and 5B show different arrangements of the instances of the system (510-515 in FIG. 5A; 521-525 in FIG. 5B) that produce different patterns of the air circulation inside the respective room.

Figure 6B:
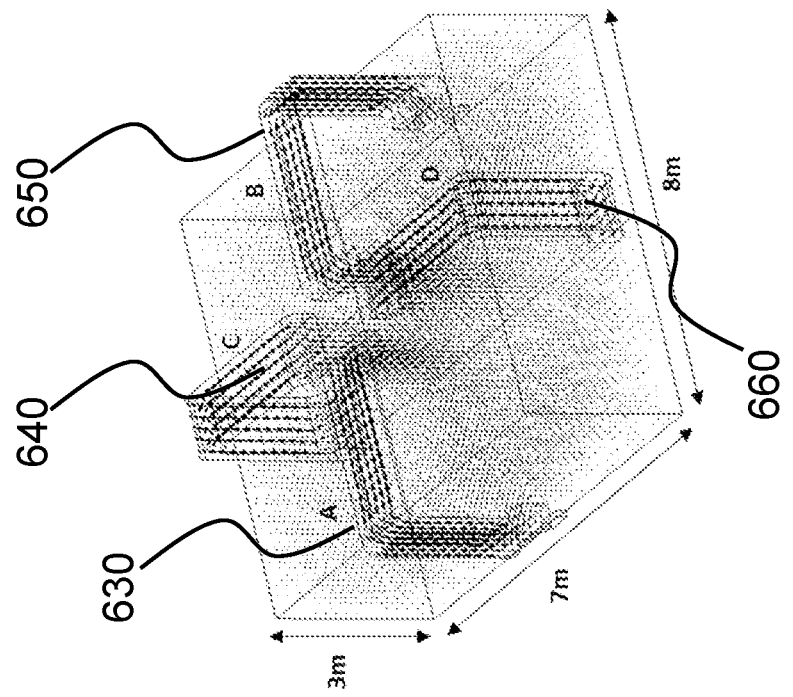
FIGS. 6A and 6B illustrate example air ventilation simulations for a room equipped with UVGI systems according to example embodiments of the technology disclosed.
Figure 6A:
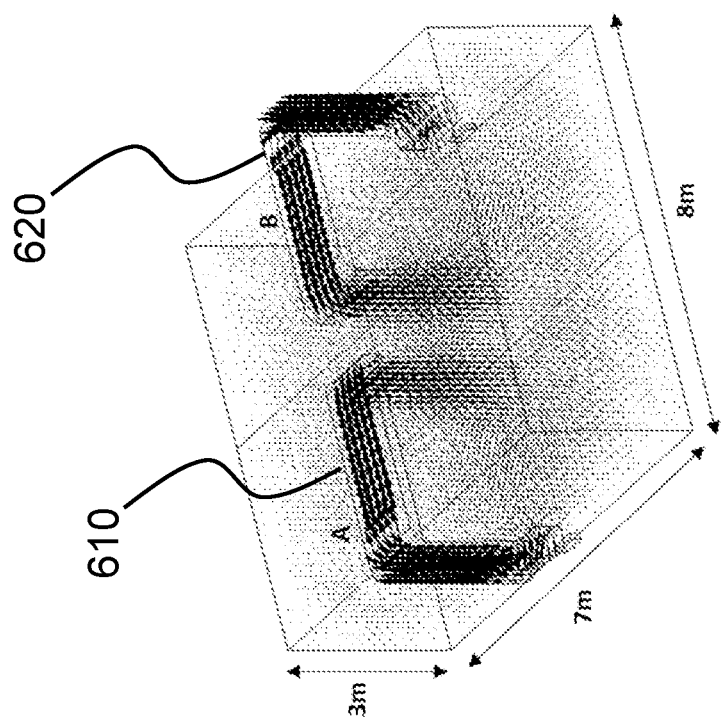

FIGS. 6A and 6B illustrate example simulation results for air ventilation in a room equipped with UVGI systems according to example embodiments of the disclosed technology. Air ventilation for a room with dimensions 8 m×7 m×3 m via AHUs was numerically simulated for two cases of air ventilation: two AHUs (610 and 620), as shown in FIG. 6A, and four AHUs (630, 640, 650, and 660), as shown in FIG. 6B. FIGS. 6A and 6B illustrate air flow velocity distribution profiles inside the room. The UVGI system is designed to be integrated inside an AHU, where air removed from the room receives UVC treatment by the UVGI system before being supplied back to the room. In both configurations shown in FIGS. 6A and 6B, identical air ducts are used, each having a uniform cross-sectional area of 1 m×0.5 m for air flow and connected to the room through its supply- and return-openings. For this room size, a total air flow rate of 0.5 m$^3$/sec provides an air exchange rate (ACH) of 10 per hour. This ACH rate meets and exceeds ventilation standards for general room settings in schools and universities, such as classrooms, lecture halls, laboratories, and conference/meeting rooms, as recommended for the Heating, Ventilation, and Air Conditioning (HVAC) systems by American Society of Heating, Refrigerating and Air-Conditioning Engineers (ASHRAE).

Arrays of arrows in black color in FIGS. 6A and 6B show the air flow velocity distribution inside the room, where local flow direction is indicated by the arrow direction and local relative velocity magnitude is illustrated by the arrow size. In both cases shown in FIGS. 6A and 6B, air exchange rates of 10 are obtained. However, air flow is localized directly under the supply-openings in the case shown in FIG. 6A, resulting in un-even or non-uniform local air exchange through the room. Air at the corners of the room in FIG. 6A does not get refreshed at the designated rate. By adding two additional AHUs and positioning the supply- and return-AHU openings at optimized positions in the room, air flow can spread evenly through the room, as shown in FIG. 6B, thus leading to effective and complete air exchange for the room. In both cases illustrated in FIGS. 6A and 6B, air flow is unidirectional (e.g., the air flows along the air flow lines between an air exit opening and an air intake of an AHU) and laminar inside the room with a velocity below 0.3 m/sec in most locations. The estimated noise due to the air flow alone is less than 5 dB.

As part of the design process, the air flow ventilation parameters are used as inputs to determine the UVC specifications of the integrated UVGI system. For the case shown in FIG. 6A, the air flow, exposed by the UVGI system to UVC radiation with a power density of $10^5$ µw/cm$^2$ for 1.5 sec, receives a UVC dose of 150,000 µW-s/cm$^2$, which is sufficient for disinfection of most of the viruses and bacteria. The travel distance of the air flow in each of the ducts shown in FIG. 6A is estimated to be 0.675 m in 1.5 sec. Therefore, the UVGI system can be designed to be integrated inside the duct with minimized change in the air flow path while providing UV radiation that covers required distance of the traveling air flow. The UVC specifications as well as dimensions of the UVGI system can be adjusted accordingly based on the AHU flow parameters. For the case shown in FIG. 6B, due to the reduced flow rate in each duct, sufficient treatment can be achieved with reduced exposure time of 0.75 sec using the UVGI system with the same power density of $10^5$ µw/cm$^2$. Consequently, the radiation coverage range of UVGI system can be reduced to 0.34 m. Alternatively, air flow in the AHU configuration shown in FIG. 6B can also receive sufficient UVC treatment if the UVGI system has a lower power density, i.e., $0.5 \times 10^5$ µw/cm$^2$, but with the same coverage distance of 0.675 m.

As mentioned above, the UVGI air disinfection system according to the disclosed technology can be incorporated inside the duct of an air handling unit (AHU). Because, as shown in FIGS. 3A and 3B, for example, distribution of the air flow inside the AHU duct exhibits a degree of non-uniformity, especially at the areas of the duct close to its air supply and return openings, one can select a position of the UVGI air disinfection system at a place along the length of the duct that would be optimal for an efficient air disinfection taking that non-uniformity of the air flow into account. From a practical point of view, when, for example, a UVGI system according to the disclosed technology is fitted into an existing duct of an air conditioning system in an apartment or an office, it might be convenient to have the UVGI system close to an air supply or an air return opening to provide ease of system installation and maintenance. Also, as UV LEDs become more and more powerful and efficient, a UVGI air disinfection system can be provided within a central air conditioning unit of a building, for example, where the air flow rate is the highest. Such an arrangement would reduce the number of the UVGI air disinfection units required for air disinfection of the entire building.

Because in many public buildings air circulation through the air conditioning system is always on, a UVGI air disinfection system according to the disclosed technology which is incorporated into the HVAC system of such a building does not need to have its own fan to create an air flow through the optical cavity of the system. In residential housings, on the other hand, the air conditioning system is typically activated only sporadically. To ensure proper air disinfection in such circumstances, some embodiments of the UVGI system according to the disclosed technology can have their own means for air circulation through the system such as, e.g., various types of motor/fan combinations. Such a UVGI system can function as a standalone unit or can be embedded into the existing ducts of the air-conditioning system of an apartment, for example.

Figure 7:
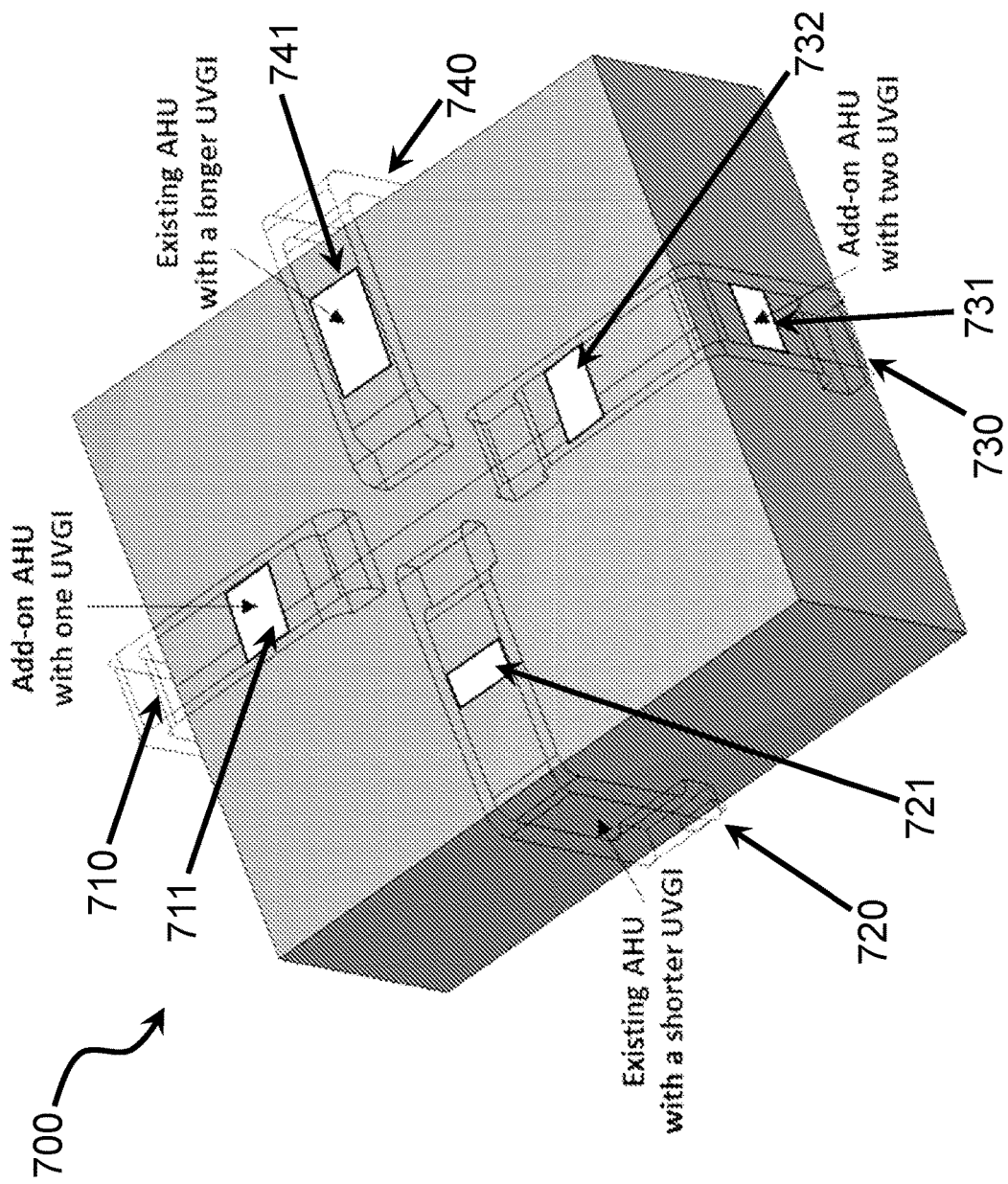
FIG. 7 illustrates various example configurations of air handling units incorporating UVGI systems for UV disinfection of air in a room according to the disclosed technology.

Various configurations can be implemented utilizing high-performance UVGI systems for UV disinfection of air in a room according to the disclosed technology, as illustrated, e.g., in FIG. 7. A UVGI system according to the technology disclosed herein can be sized and integrated inside elements (e.g., ducts) of existing HVAC systems. As shown in FIG. 7, AHUs 720 and 740 which are a part of an existing HVAC system of an apartment or a room 700, include UVGI systems 721, and 741 which are installed within the ducts of the AHUs 720 and 740, respectively. An AHU with a UVGI system according to the disclosed technology can also be installed as an add-on system, i.e., as a new ventilation system independent from the existing heating/cooling system of, e.g., an apartment or a building especially where temperature control of air flow inside a room is not required. As shown in FIG. 7, the room 700 is equipped with two add-on AHU units 710 and 730. The AHU 710 includes a single UVGI system which is installed within the air duct of the AHU 710. The AHU 730 also includes two UVGI units which are installed within the air duct of the AHU 730. As illustrated in FIG. 7, UVGI systems according to the disclosed technology can have different geometries (e.g., length, volume or extent of a space within which air inside the system interacts with UVC radiation produced by the light source(s) and optics elements of the system that can form, e.g., an optical cavity within the system). As further illustrated in FIG. 7, an air handling unit can include different number of UVGI systems which can also be positioned at different locations along the unit, for example. The number and position of each AHU inside a room can be determined based, e.g., on the desired ACH for a given size and geometry of the room. Proper mapping of the AHUs supply- and return-opening locations produces unidirectional and evenly distributed air flow throughout the entire room. As a result, the air inside the room can be refreshed at all locations using the highly efficient UVC treatment and disinfection systems disclosed herein.

Figure 8B:
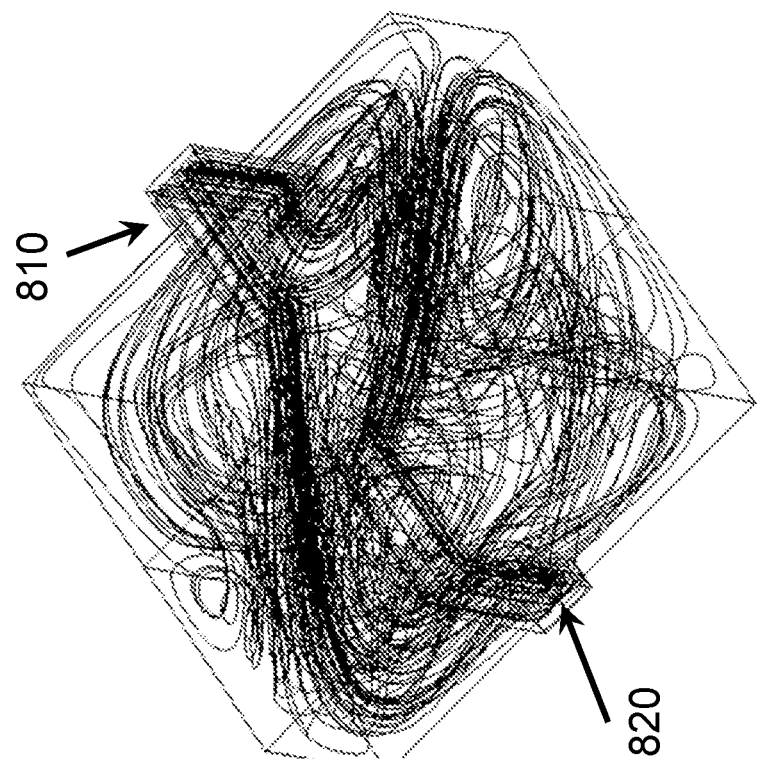
FIGS. 8A and 8B illustrate example simulation results for air flow patterns inside a room.
Figure 8A:
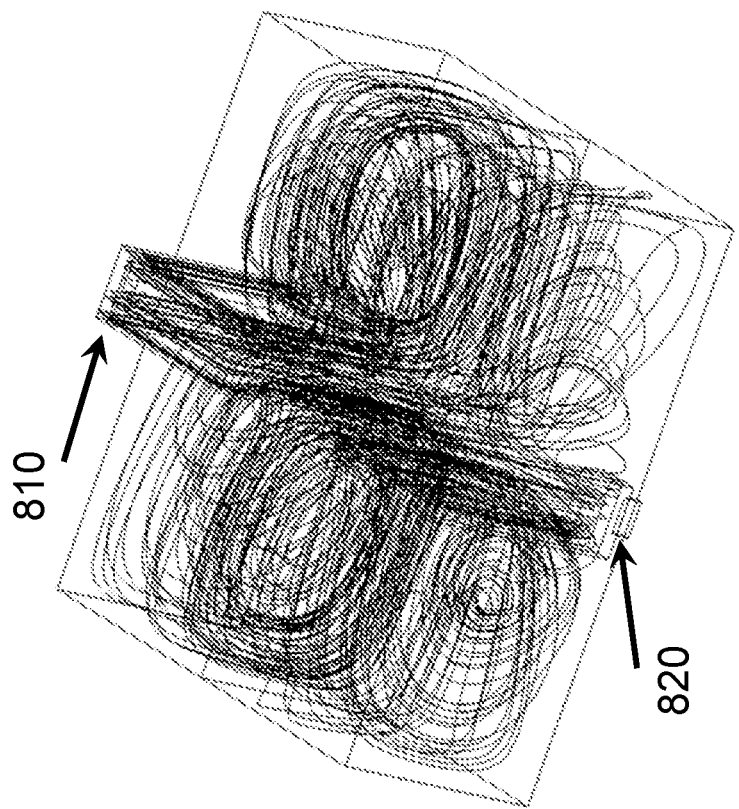

In addition, flow directions at the AHU openings (e.g., exit openings) can be adjusted and controlled, to certain degrees, by rotatable adapters, for example. FIGS. 8A and 8B illustrate example simulation results showing the air flow patterns inside a room, without (FIG. 8A) and with (FIG. 8B) rotatable adapters installed at the exit openings of the AHUs 810 and 820. For fixed opening locations and flow directions (FIG. 8A), persistent vortices are established at the same locations inside the room, and the air inside the vortices cannot be efficiently refreshed. By varying the angles of the air flow at the supply and/or return openings of the AHUs using, e.g., rotatable adapters, air flow patterns in the room can change with time, and persistent vortices at the same locations can be minimized or eliminated. A rotatable adapter can include a plate on a hinge which can be rotated to direct the flow of air coming from or going into the opening. The adapters can be set at desired directions or can be programmed to periodically or continuously change flow directions at the openings based on programed schedules. The rotational adapters enable active scanning of air flow through the entire room, and therefore, high level of air refreshment inside the room can be achieved. Both a UVGI system according to the technology disclosed herein and the AHU duct incorporating such a system can vary in size. Optionally, two or multiple UVGI systems can be integrated inside one AHU duct to enhance the UVC treatment of air passing through the duct. The UVGI/AHU systems can be preferably installed in locations where UVC irradiation that can leak from the system is completely blocked and sealed with no exposures to humans, animals, or structures or material that would deteriorate under long-term UV exposures. In some embodiments, coatings (i.e., absorbers) can be placed in or applied to the ducts to absorb the UV radiation that may leak from the concentrators, thus further preventing the UV radiation from leaking into the room. An UVGI/AHU system according to the disclosed technology can be controlled by an on/off switch, for example, and/or according to a programed schedule. Access panels and/or doors can be implemented at proper location(s) of an AHU duct allowing e.g., replacement of the UVC sources, and/or regular maintenance of a UVGI system according to the disclosed technology which is installed within the duct.

As noted earlier, a UVGI system or unit according to the disclosed technology comprises an optical cavity that includes non-imaging optics with the reflector configuration optimized based on, e.g., air flow, light distribution and light fluence within the optical cavity. An air disinfection system according to an example embodiment of the disclosed technology can include a single AHU or multiple AHUs integrated with UVGI units. AHUs can be arranged to reduce air flow vortices inside a room and can be configured to meet a minimum value of air change per hour in the room, which can be adjusted by varying speed of the fan(s) of the air handling units, for example. Depending on the air flow requirements, all or part of the air that passes through the UVGI units can be directed to air ducts of an existing HVAC system. For example, at least some of the AHUs that incorporate an UVGI unit can be a part of an existing HVAC system providing ventilation for the room. Alternatively, or additionally, one or more AHUs of an air disinfection system according to the disclosed technology can operate as stand-alone units. Furthermore, the disclosed UVGI systems can be configured to operate in a positive pressure system, where the room maintains a higher pressure inside the treated area than that of the surrounding environment, or in a negative pressure system, where the outside air is allowed to enter the room. Optionally, an air disinfection system according to the disclosed technology can include or can be interfaced with one or more air filters that remove particulate matter from the airflow passing through the system.

Figure 9:
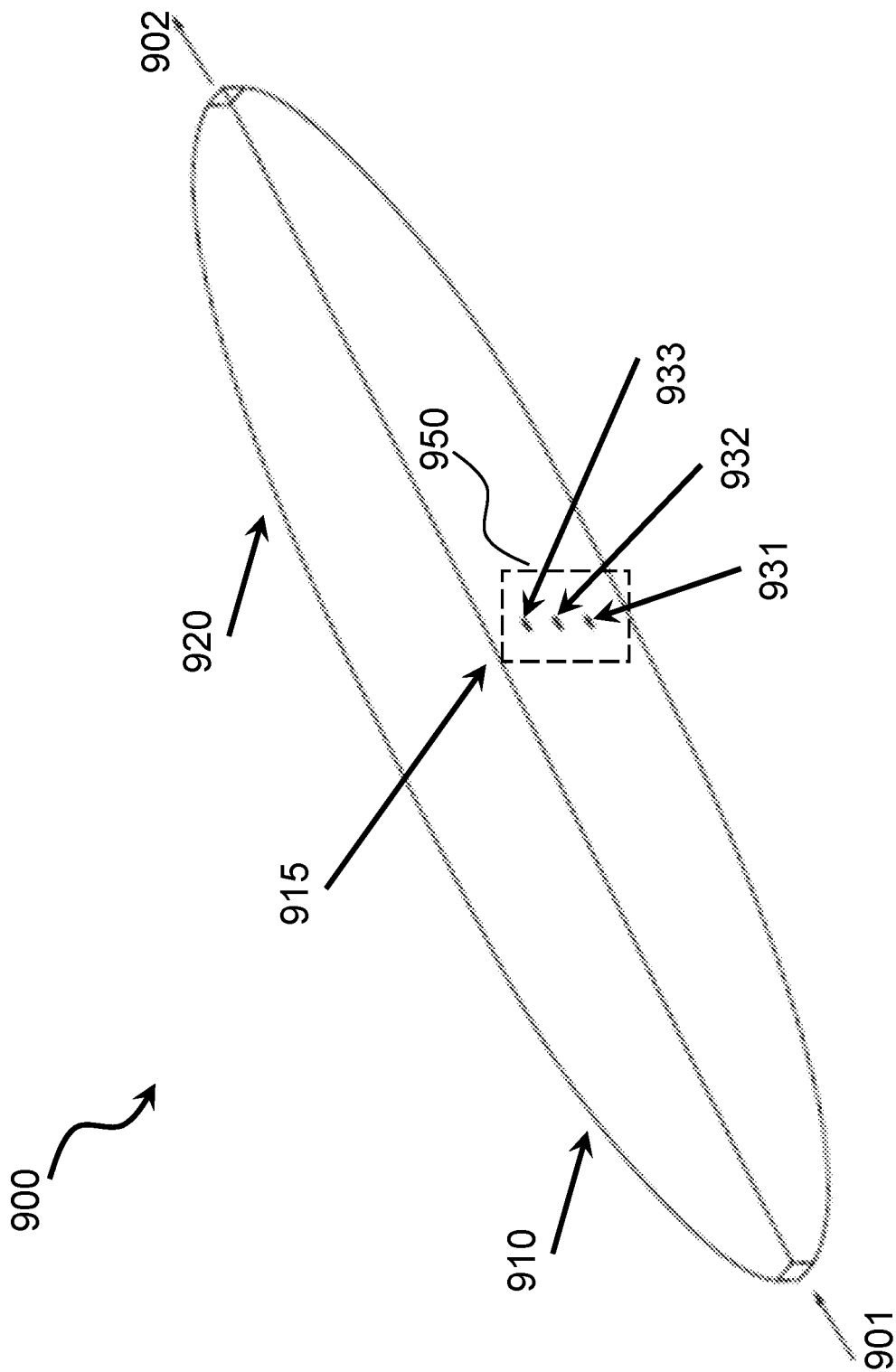
FIG. 9 illustrates an air-flow concentrator of a UVGI system according to an example embodiment of the disclosed technology.

FIG. 9 illustrates an air-flow concentrator 900 of a UVGI system according to an example embodiment.

To facilitate the description, the air-flow concentrator 900 shown in FIG. 9 can be considered as including two sub-concentrators, 910 and 920, that are mated together at the large ends of each. In some embodiments the concentrator 900 can actually include two sub-concentrators, while in other embodiments the concentrator 900 can be a unitary structure. The air enters the small end of the first sub-concentrator 910 and then flows to the small end of the second sub-concentrator 920. Arrows 901 and 902 in FIG. 9 show direction of the air incoming into the concentrator 900 and leaving the concentrator 900, respectively. According to some example embodiments, the sub-concentrators 910 and 920 are tailored edge-ray type light concentrators. This type of concentrator has many sub-designs types within its ranks including for example, standard edge ray types (e.g., compound parabolic concentrator (CPC)), non-edge ray design types, and tailored edge-ray design type. The differences between the types are associated with the distribution of radiation at the target planes (e.g., planes proximate to the small ends of the sub-concentrators).

According to some example embodiments, the UVC radiation is injected into the air-flow concentrator 900 through one or more distinct optical systems, hereafter called injector optics, injection optics, or light injectors. The injector optics of the concentrator 900 can be located, for example, at or proximate to a central location 915 (e.g., an area of the concentrator 900 where the sub-concentrators 910 and 920 meet or are interfaced with each other). As FIG. 9 illustrates, the concentrator 900 can incorporate one or more slots (e.g., three slots 931, 932, and 933, as shown in FIG. 9). The UV radiation produced by the injector optics positioned proximate to the slot can be injected into the inner space of the concentrator 900. The injection optics can include reflective, refractive, TIR, or hybrid components, as well as imaging (e.g., lenses, parabola, ellipses, other conics) or non-imaging (e.g., edge-ray type including tailored-edge, non-edge, CPC, other types of concentrators) components. The injection optics design can be optimized to work with the particular air-flow concentrator.

Figure 10:
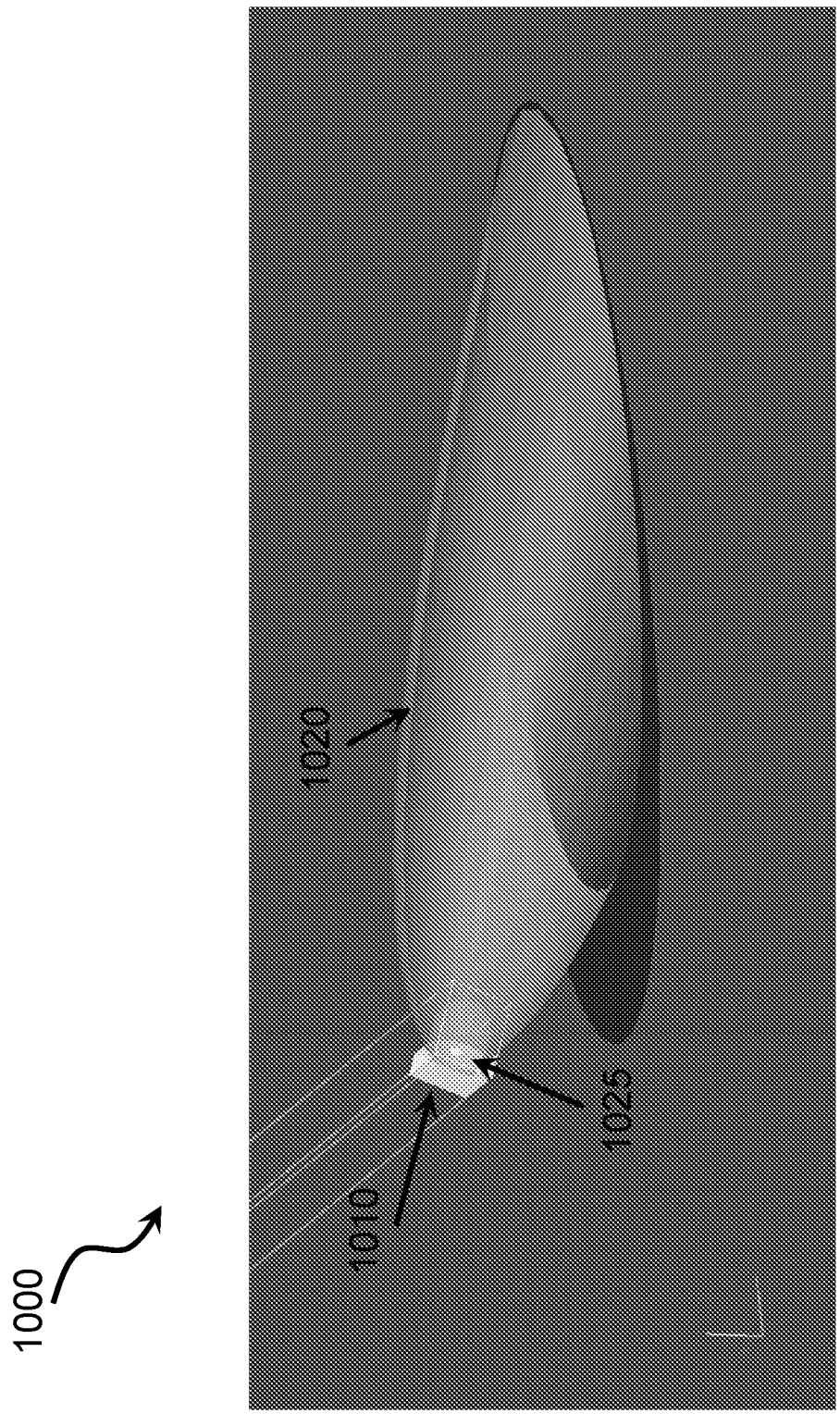
FIG. 10 illustrates an individual UV light injection optics according to an example embodiment of the technology disclosed.

FIG. 10 illustrates an individual UV light injection optics 1000 according to an example embodiment. The injection optics 1000 includes a light source 1010. According to some embodiments, the light source 1010 includes a UVC emitter (e.g., a UV emitting diode (UVED)) coupled to a tailored edge-ray type concentrator 1020. The UVED 1010 is placed at the small aperture 1025 of its concentrator 1020, thus taking the hemispherical emission from the UVED and transforming it into a smaller angular distribution. Light injectors according to the disclosed technology can include imaging, or non-imaging, optics. Edge-ray type concentrators used in certain example embodiments of light injectors are easy to setup, easy to tailor to a particular air-flow concentrator, and can provide a desired maximum input angle into the air-flow concentrators they are coupled to.

FIG. 11 shows an enlarged view of the area 950 of the air-flow concentrator 900 shown in FIG. 9. FIG. 11 illustrates three light injection channels 1110, 1120, and 1130 in the body of the concentrator 900. FIG. 11 further illustrates three light injectors 1150, 1160, and 1170 coupled to the light injection channels 1110, 1120, and 1130, respectively. Note that different embodiments of the UVGI systems according to the disclosed technology can include different number of light injection channels through which light produced by light injectors is injected into the inner space of the air-flow concentrator of the system and those channels can have different sizes, geometries and orientations (e.g., facing to the left and to the right) on the concentrator's body, as well as can be located on one side or on multiple sides or areas of the air-flow concentrator.

FIG. 12 shows a rendering of the air-flow concentrator 900 in which the sub-concentrator 920 is shown as a wireframe. All optical surfaces of the concentrator 900 are specularly reflective. The interior of the concentrator 900 is open so that air can flow down the length of the concentrator 900. The air comes into the left-end aperture 905 and out the right-end aperture 907 of the concentrator 900. Air flow within the concentrator 900 is not restricted.

FIGS. 13A and 13B show two different views of the sub-concentrator 920 of the concentrator 900 rendered as a wireframe. FIG. 13A shows a side view of the sub-concentrator 920 while FIG. 13B shows a view from the large end to the small end of the sub-concentrator 920. Note that cross-sectional shape of the sub-concentrator 920 (as well as that of the sub-concentrator 910) can have other shapes: e.g., square, rectangular, circular, elliptical, etc.

FIG. 14 illustrates example trajectories of light rays injected into the air-flow concentrator 1400 according to an example embodiment of the disclosed technology. As FIG. 14 illustrates, rays (radiation) cannot (easily) leak from the concentrator 1400, which is built according to a non-imaging concentrator design according to the disclosed technology. FIG. 14 further illustrates that the UV radiation inside the concentrator 1400 is concentrated proximate to the ends 1410 and 1420 of the concentrator 1400.

FIGS. 15A and 15B illustrate flux levels (concentration) of UV radiation proximate to and within the concentrator 1500 according to an example embodiment. Note that only flux levels in the right-hand half of the concentrator 1500 are shown. The left-hand half of the concentrator 1500 has flux level distribution which is similar to that shown in FIGS. 15A and 15B for its right-hand half. The concentrator 1500 is equipped with a single UV light injection optics channel. FIG. 15A shows that flux level in the Z plane 1510 located just outside the air-flow concentrator 1500 includes no (or negligible) levels of UV radiation leaking from the concentrator 1500. FIG. 15B shows that UV flux level in the Z plane 1520 brought to caustic proximate to the right-hand end of the concentrator 1500 shows maximal concentration and uniformity across air-flow concentrator cross section. Flux uniformity within the concentrator 1500 (e.g., in the plane 1520) indicates that all air passing through the concentrator 1500 will be treated equally. Note that the air is treated at both ends (left and right) of the concentrator 1500.

FIGS. 16A and 16B illustrate flux levels (concentration) of UV radiation proximate to and within the concentrator

1600 according to another example embodiment. Note that only flux levels in the right-hand half of the concentrator 1600 are shown in FIGS. 16A and 16B but similar distributions are observed for the left-hand half of the concentrator 1600. The concentrator 1600 shown in FIGS. 16A and 16B is equipped with three UV light injection optics channels. FIG. 16A shows that flux level in the Z plane 1610 located just outside the air-flow concentrator 1600 indicates no to negligible levels of UV radiation leaking from the concentrator 1600. FIG. 16B shows that UV flux level in the Z plane 1620 brought to caustic proximate to the right-hand end of the concentrator 1600 shows maximal concentration and uniformity across air-flow concentrator cross section. Flux uniformity within the concentrator 1600 (e.g., in the plane 1620) indicates that all air passing through the concentrator 1600 will be treated equally. Note that the air is treated at both ends (left and right) of the concentrator 1600. Comparison of FIGS. 15B and 16B reveals that increasing the number of the light injection channels leads to a proportional increase in the flux of UV radiation within the concentrator (provided, e.g., that the same light sources are used for each of the injection channels).

FIG. 17 shows an air-flow concentrator 1700 according to another example embodiment of the disclosed technology. Similarly, for example, to the air-flow concentrator shown in FIG. 9, the concentrator 1700 can be considered as including sub-concentrators 1710 and 1720. The sub-concentrators 1710 and 1720 can be optionally interfaced with each other through a rectangular coupler 1750 positioned between the sub-concentrators 1710 and 1720. In some embodiments, the coupler is omitted. The cross-sectional shape of the sub-concentrators 1710 and 1720 at the location where they meet (e.g., at the coupler 1750) can be rectangular, as shown in FIG. 17. UV radiation is injected into the concentrator 1700 and kept trapped due to the acceptance angle. The injected radiation bounces back and forth within sub-concentrators 1710 and 1720 of the concentrator 1700, and obtains maximum concentration (i.e., highest flux) at the far ends (left and right) of the concentrator 1700.

FIG. 18 shows an array 1800 of the air-flow concentrators according to an example embodiment of the disclosed technology. The array 1800 includes concentrators 1810, 1820, 1830, 1840, 1850, 1860, 1870, 1880, and 1890 arranged in a side-by-side manner. Each concentrator is similar to the concentrator shown in FIG. 17.

FIG. 19 shows another array 1900 of the air-flow concentrators according to an example embodiment of the disclosed technology. The array 1900 includes concentrators 1910, 1920, 1930, 1940, 1950, 1960, 1970, 1980, and 1990. Elements (concentrators) 1910, 1920, and 1930 of the array 1900 form a group 1901 in which the concentrators are arranged in a side-by-side manner along the X axis of the array 1900. Elements (concentrators) 1940, 1950, and 1960 of the array 1900 form another group 1902 in which the concentrators are arranged in a side-by-side manner along the X axis of the array 1900. Elements (concentrators) 1970, 1980, and 1990 of the array 1900 form yet another group 1903 in which the concentrators are arranged in a side-by-side manner along the X axis of the array 1900. Groups 1901, 1902, and 1903 of the concentrators within the array 1900 are arranged in an end-to end manner, wherein air outputs of the concentrators in the group 1901 face the corresponding air inputs of the concentrators in the group 1902. Similarly, air outputs of the concentrators in the group 1902 face the corresponding air inputs of the concentrators in the group 1903.

Figure 19:
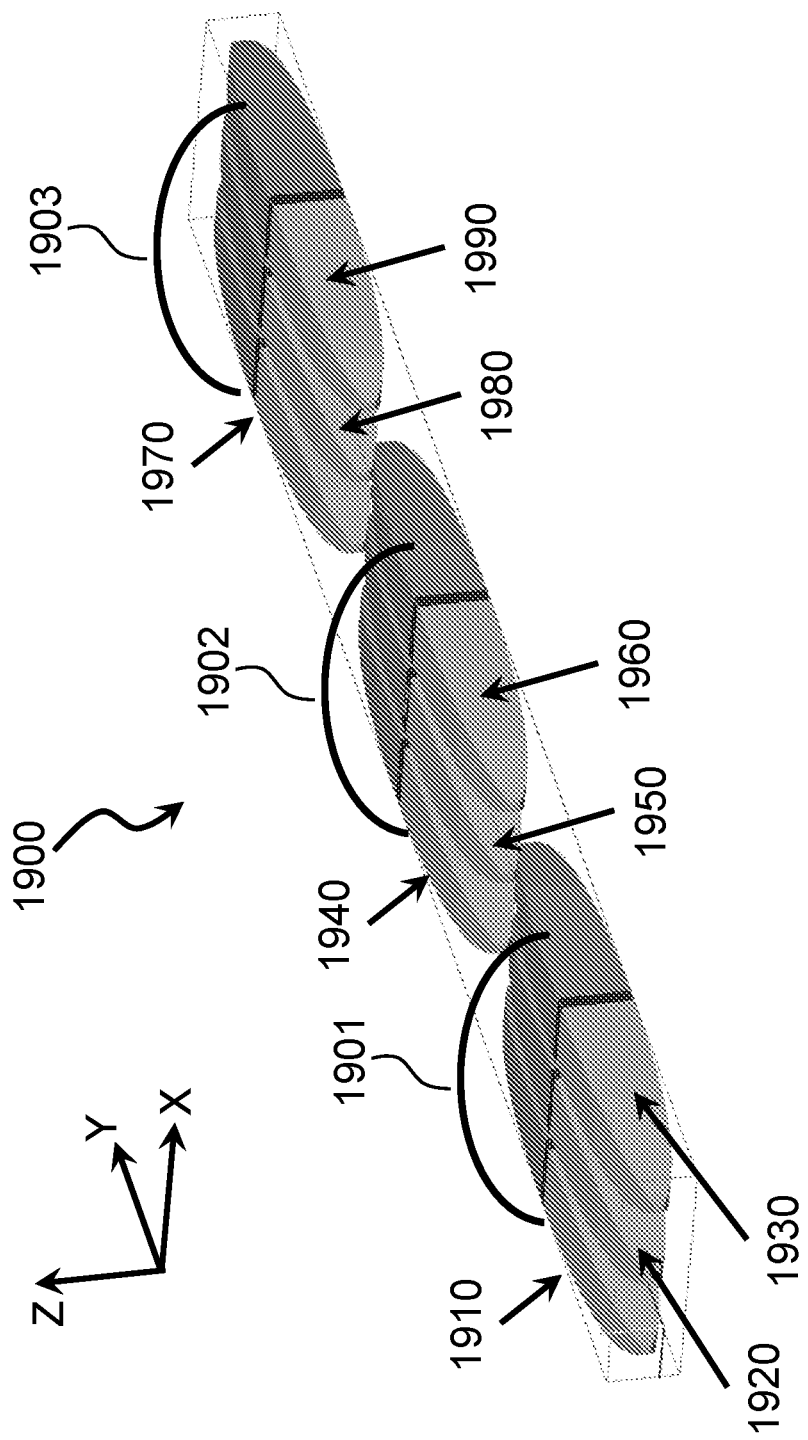
FIG. 19 shows another array of air-flow concentrators according to another example embodiment of the disclosed technology.

A UVGI system according to the disclosed technology can include one or more arrays of air-flow concentrators. Whereas the configuration in FIG. 19 shows concentrator that in arrays that are arranged in the X and Y directions, generally, concentrators can be arrayed in all three directions (e.g., X, Y, and Z). Arraying the concentrators allows for additional air treatment steps, reduced channel sizes if desired, increased volume of treated air, and/or allowing different treatments in each concentrator.

Figure 11:
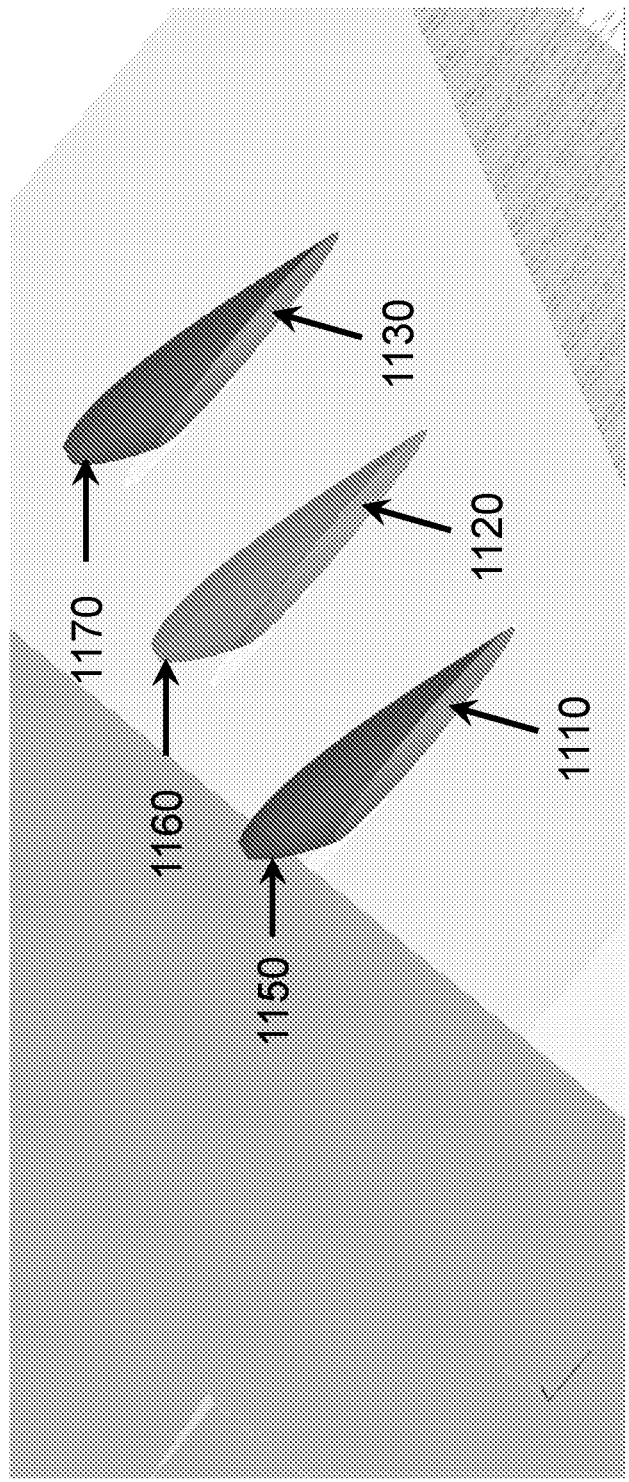
FIG. 11 shows an enlarged view of an area of the air-flow concentrator shown in FIG. 9.
Figure 12:
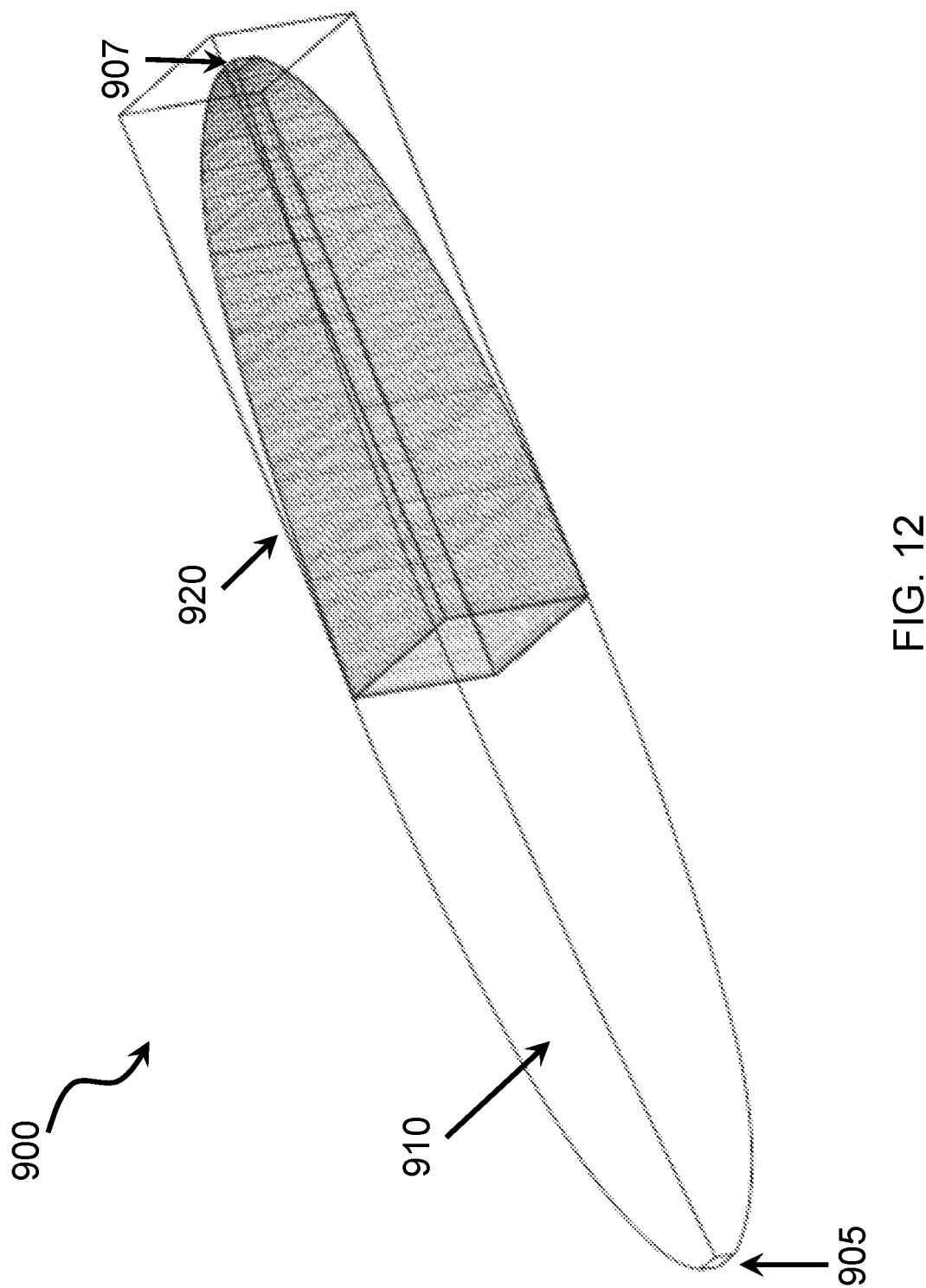
FIG. 12 shows a rendering of the air-flow concentrator shown in FIG. 9.
Figure 13B:
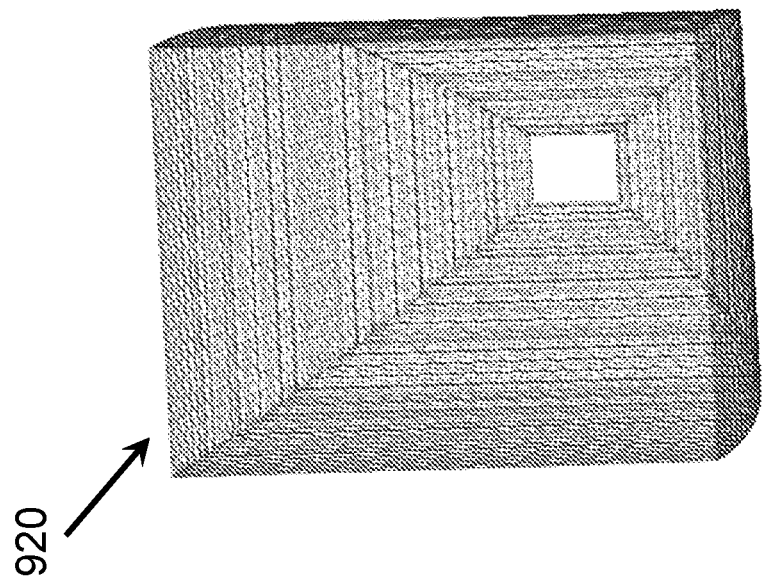
FIGS. 13A-13B show two views of a sub-concentrator of the concentrator shown in FIGS. 9 and 12.
Figure 13A:
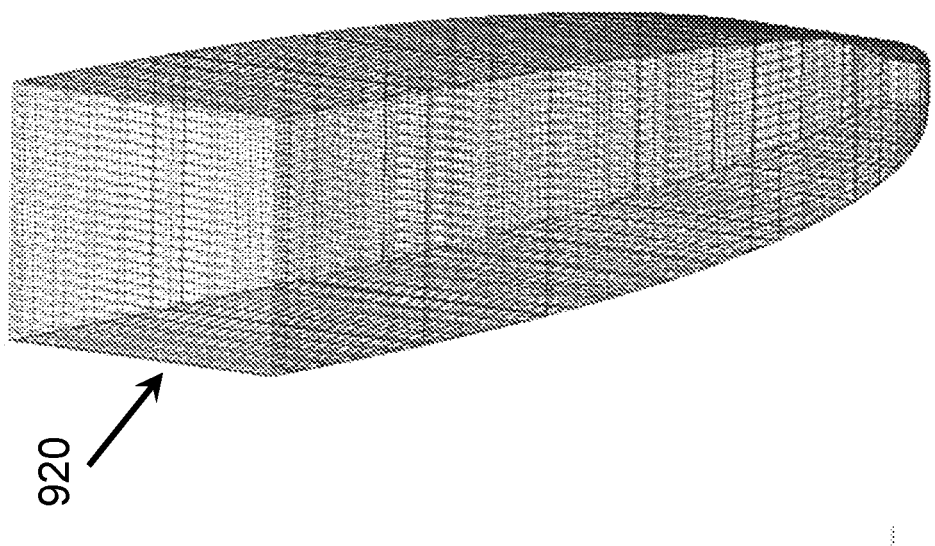
Figure 14:
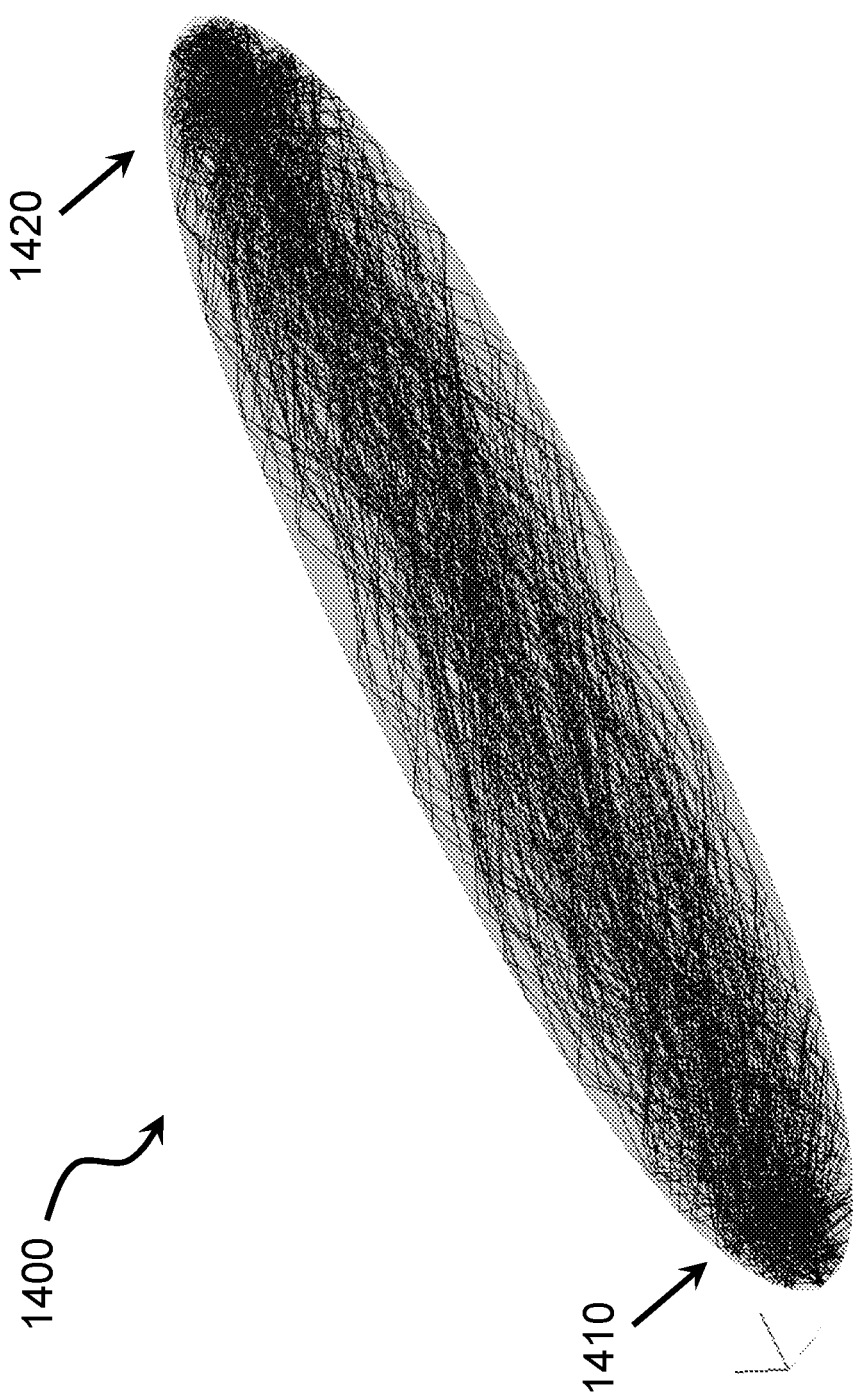
FIG. 14 illustrates example trajectories of light rays injected into an air-flow concentrator according to an example embodiment of the disclosed technology.
Figure 15A:
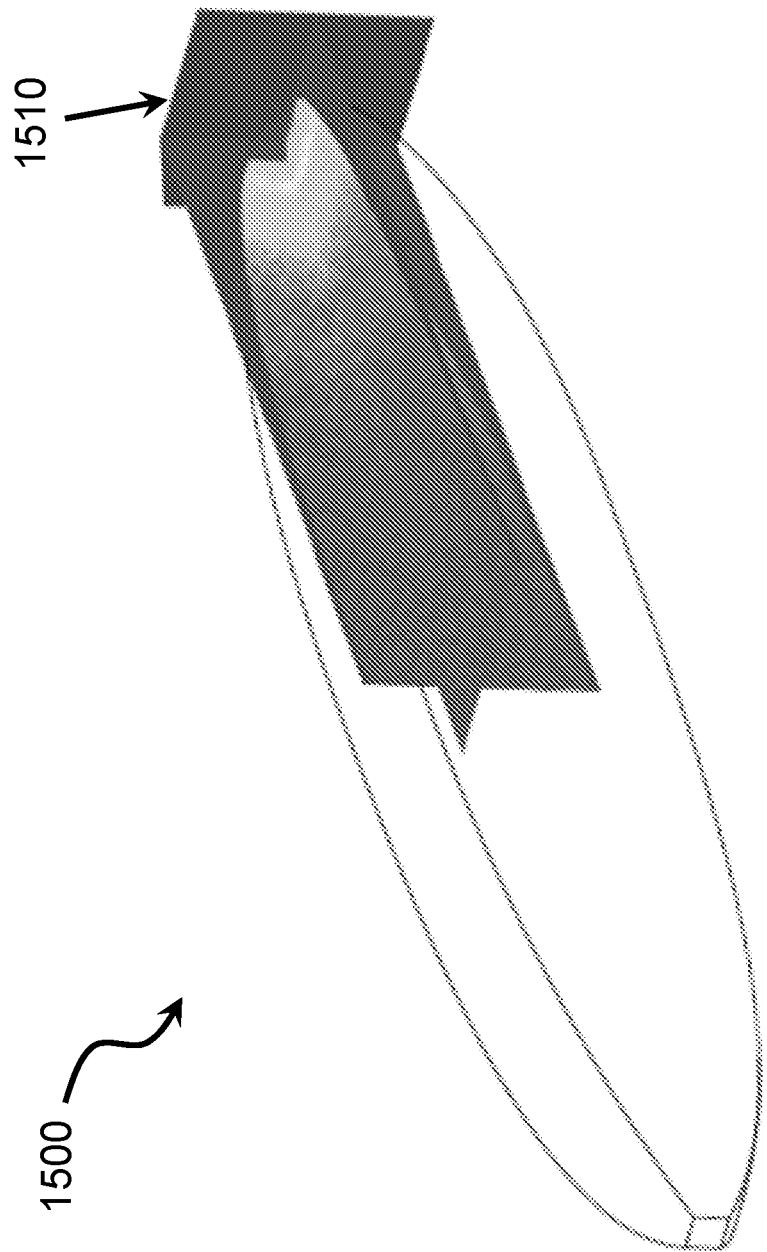
FIGS. 15A and 15B illustrate flux levels of UV radiation for a concentrator according to an example embodiment of the disclosed technology.
Figure 15B:
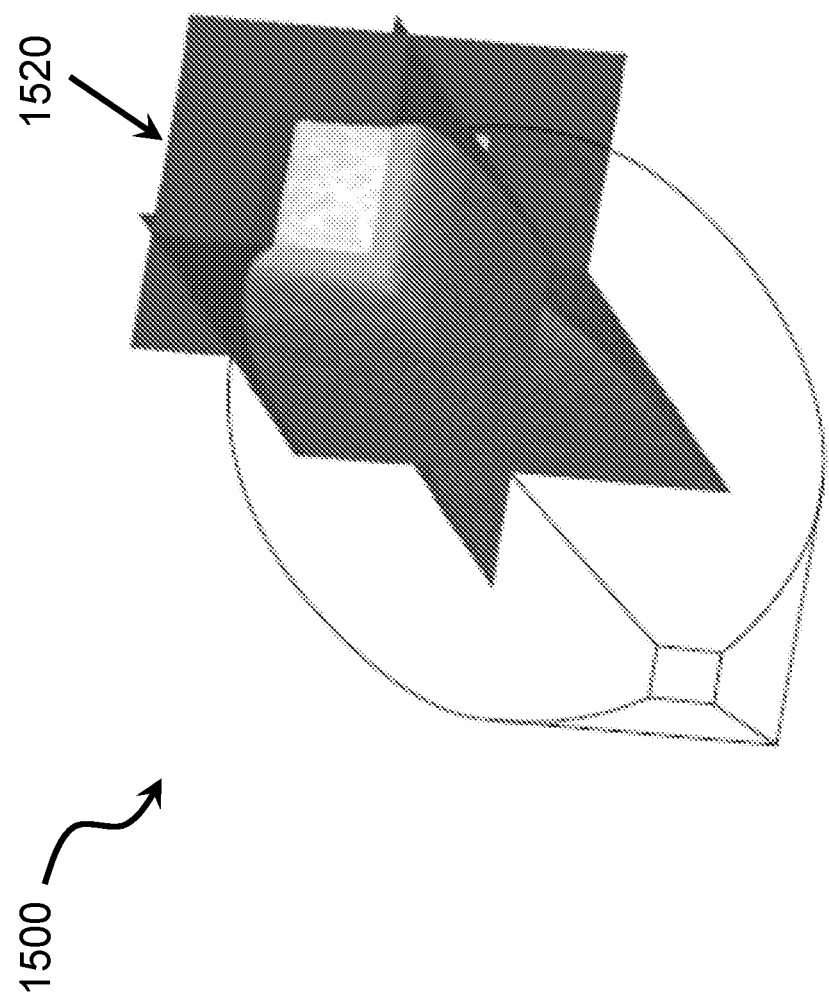
Figure 16A:
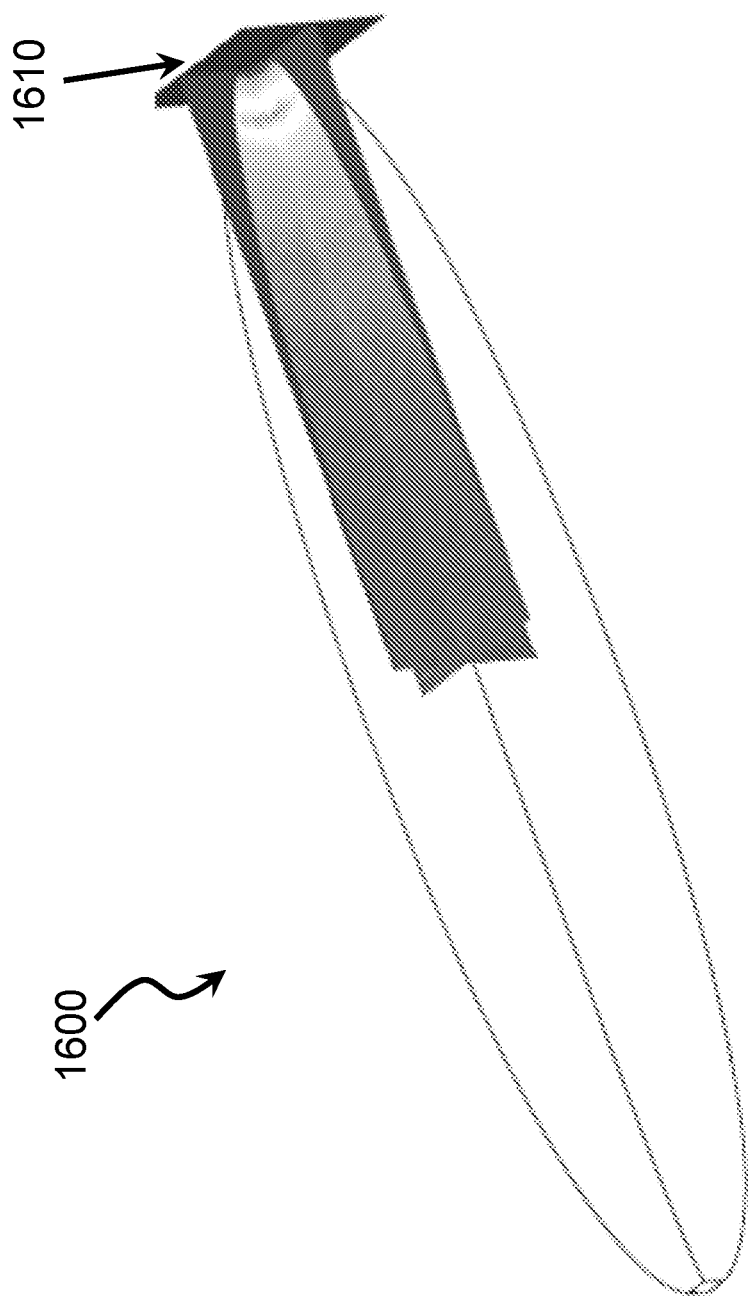
FIGS. 16A and 16B illustrate flux levels of UV radiation for another concentrator according to an example embodiment of the disclosed technology.
Figure 16B:
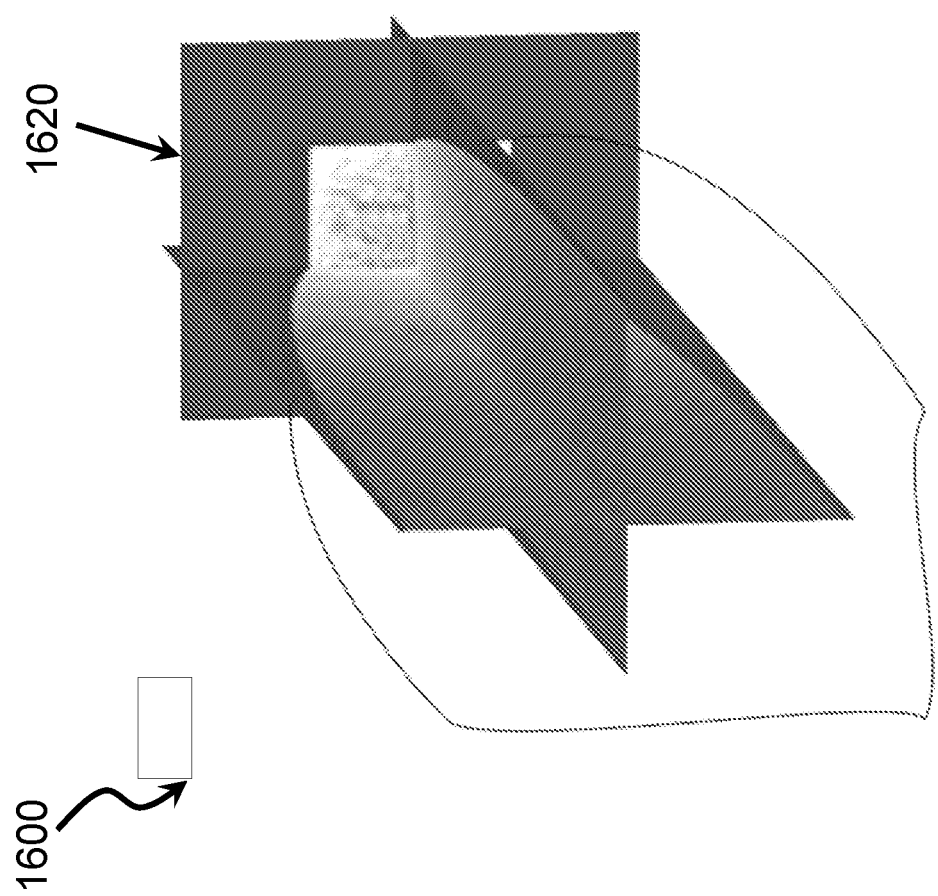
Figure 17:
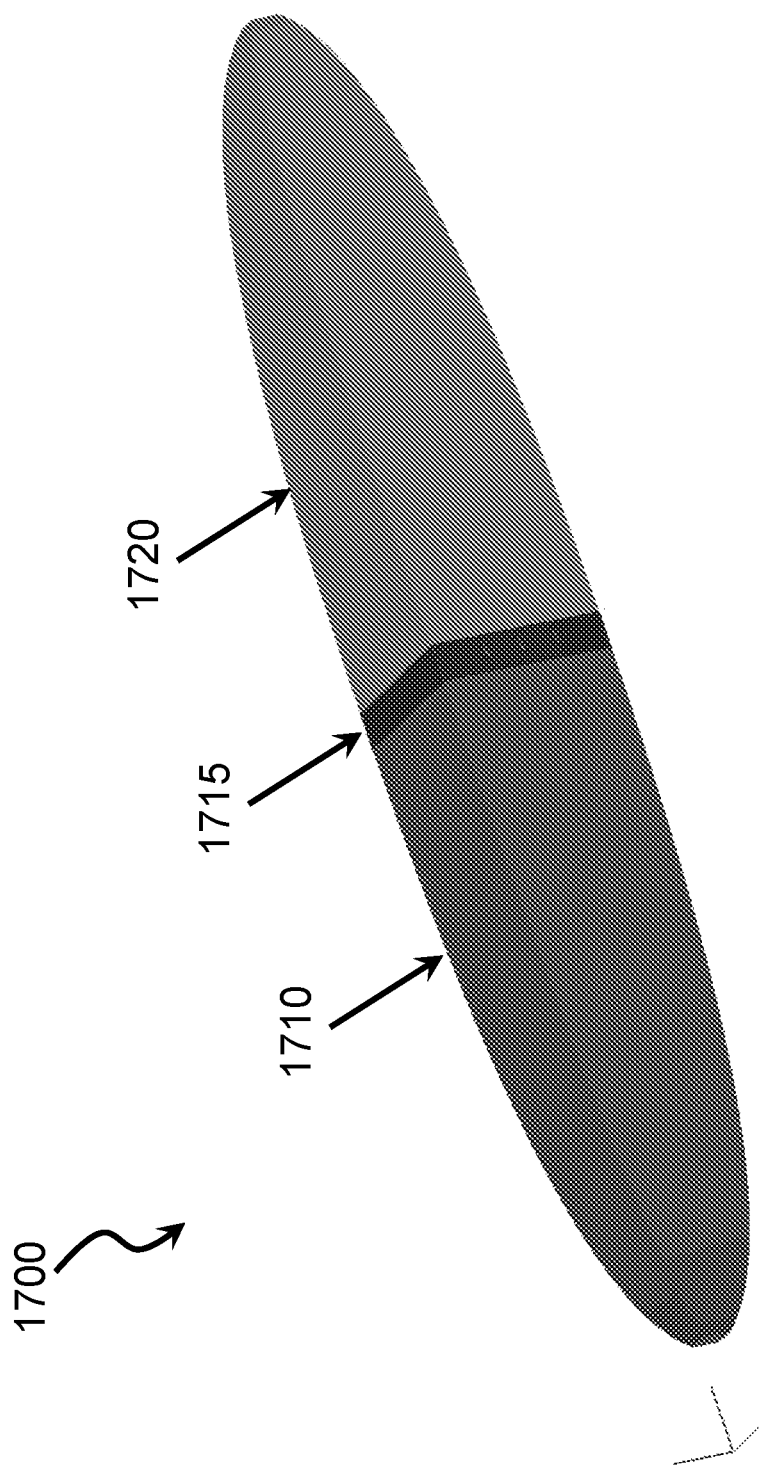
FIG. 17 shows an air-flow concentrator according to another example embodiment of the disclosed technology.
Figure 18:
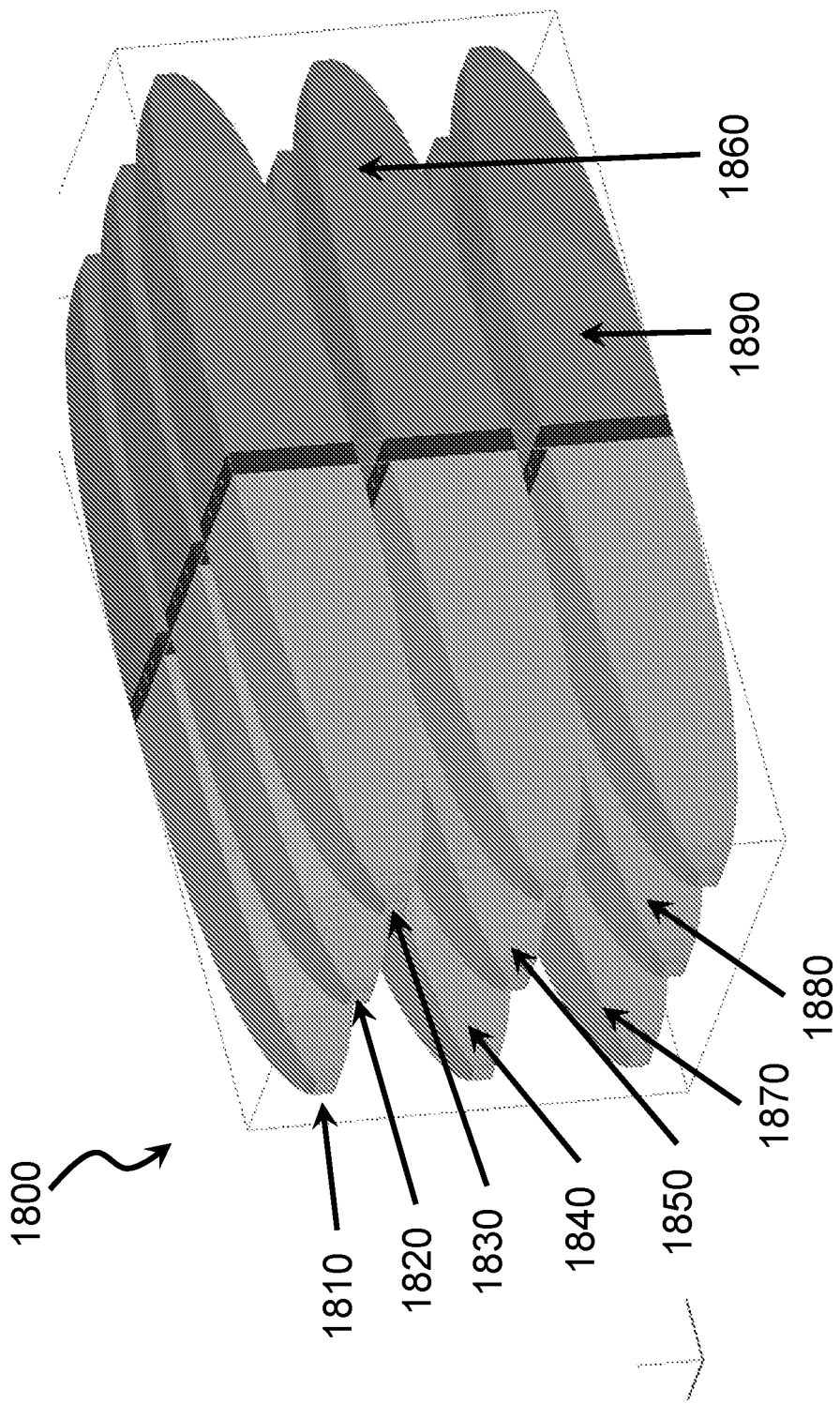
FIG. 18 shows an array of air-flow concentrators according to another example embodiment of the disclosed technology.

The air-flow sub-concentrators according to the disclosed technology (e.g., sub-concentrators 910 and 920 illustrated in FIG. 9) have a design aspect that traps the UV radiation injected into them. This is accomplished by tailoring the acceptance angle of the sub-concentrators in one or multiple dimensions, as well as the emission profile of the injection optics (e.g., the injector 1000 illustrated in FIG. 10 or injectors 1150, 1160, and 1170 illustrated in FIG. 11). The tailoring of light propagation characteristics of the injection optics and the sub-concentrators allow the air flow concentrator to be specifically designed for the air flow rate demands, desired flux density levels of UV radiation for effective air treatment over a specified time, and desired distribution of UV radiation at the concentrated flux region of the air flow concentrator, while providing minimal leakage of UV radiation from the device.

Non-imaging design of the concentrators according to the disclosed technology keeps radiation (e.g., UVC radiation) trapped inside the air-flow concentrator. Although there is no need for external reflective caps to recirculate light inside a concentrator, they can be added if desired. Edge-ray type concentrator design according to the disclosed technology enables tailoring/designing UV radiation flux distribution at the ends of the concentrator to, e.g., provide high uniformity of the radiation flux across the concentrator cross section. Both ends of an air-flow concentrator see high flux/concentration of UV radiation which allows to treat air passing through the concentrator twice.

Light injection optics of a UVGI system according to the disclosed technology can include various types of light sources (e.g., UVED, arc lamp), and different optic types (e.g, reflective, refractive, TIR, etc.). Edge-ray type light injectors according to the disclosed technology can be designed to provide trapped angular distribution while assisting in tailoring the distribution of flux at the ends of the air-flow concentrator. Injector optics can be arrayed to increase flux/concentration of UV radiation. Air-flow concentrators themselves can be arrayed (e.g., in a side-to-side (parallel) or end-to-end (series) manner) according to some example embodiments. Air-flow concentrators according to some embodiments of the disclosed technology do not restrict air flow through them and can be designed according to a desired air flow rate, desired distribution of light flux at the ends of air-flow concentrator as well as various design constraints (e.g., tradeoffs between optics and air flow design).

Figure 20:
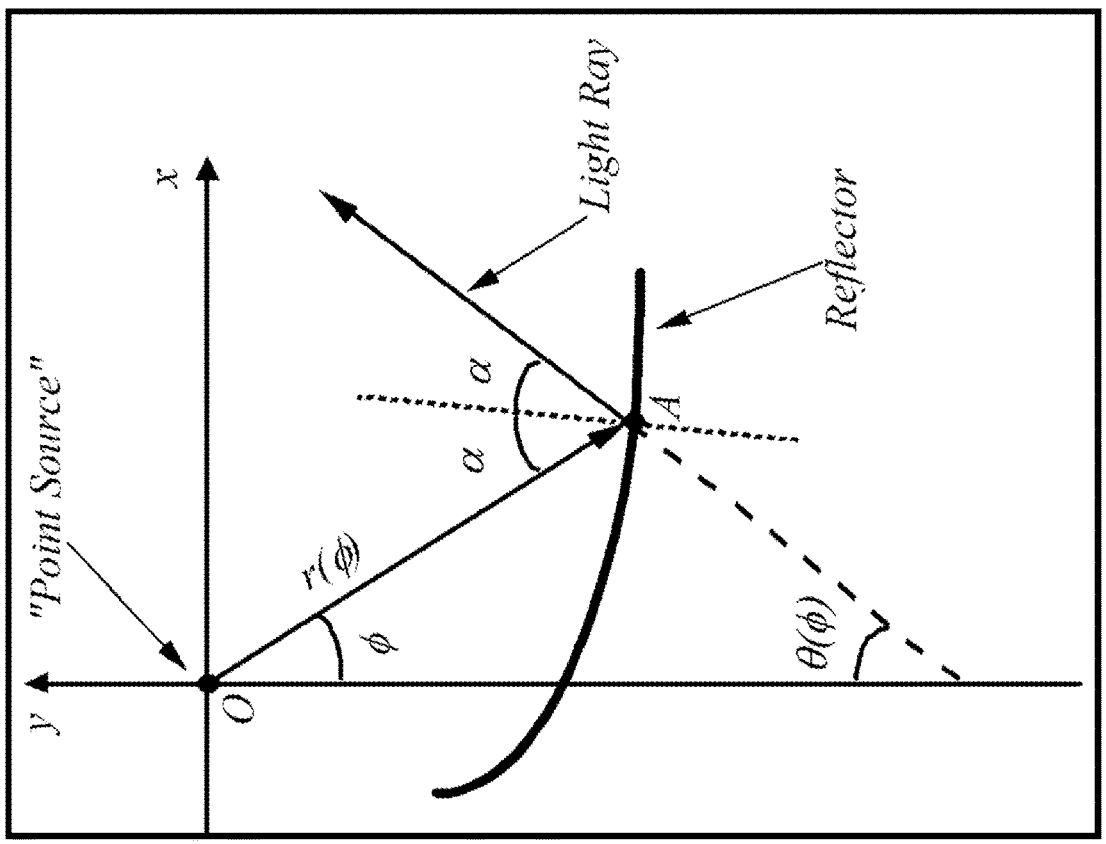
FIG. 20 illustrates example parameters used in a concentrator design according to the disclosed technology.

Various design methods such as, for example, edge-ray, non-edge ray, SMS, flow-line methods, as well as tailored edge-ray design methods can be used to produce concentrators of the UVGI systems according to the disclosed technology. The design of the air-flow concentrator and injector optics can be implemented around the desired air flow, flux distribution requirements, etc. The following considerations can be used in the design process, with reference to FIG. 20 which illustrates a number of parameters used to obtain concentrator geometry:

Design Around a Source of Intensity $I_{src}(\phi)$.

Equation That Governs Reflector Shape, where a is the Radius of the Source:

$$\frac{d \ln(r(\phi))}{d\phi} = \tan(\alpha) + \frac{a}{r(\phi)}$$

The Reflector Shape for a Point Source:

$$r(\phi) = r_1 \exp\left[\int_{\phi_1}^{\phi} \tan\left(\frac{s - \theta(s)}{2}\right) ds\right]$$

The Intensity Distribution for Target Uniformity is:

$$\theta(\phi) = \arctan\left[\tan\theta_1 + \int_{\phi_1}^{\phi} I_{src}(t) dt\right]$$

If we desire target uniformity ($I_{tar}(\theta)=c_1$), then:

$$\int_{\theta_1}^{\theta} I_{tar}(t) dt = c_1(\theta - \theta_1) = \pm \int_{\phi_1}^{\phi} I_{src}(s) ds$$

The ± is for:
Increasing (Hyperbolic design): $\theta_1=\theta(\phi_1)$ and $\theta_2=\theta(\phi_2)$
  Positive magnification of the source
  The reflected angle increases with increasing reflector position
Decreasing (Elliptic design): $\theta_1=\theta(\phi_2)$ and $\theta_2=\theta(\phi_1)$
  Negative magnification of the source
  The reflected angle decreases with increasing reflector position
Note that we use: $\theta_1 \leq \theta_2$ and $\phi_1 \leq \theta_2$
The source (i.e., point) emission profile:
Uniform: $I_{src}(\phi)=c_2$. Other distributions can be also used.
Solving gives:

$$\int_{\theta_1}^{\theta} I_{tar}(t) dt = c_1(\theta - \theta_1) = \pm \int_{\phi_1}^{\phi} I_{src}(s) ds = \pm c_2(\phi - \phi_1)$$

We can simplify:

$$\theta - \theta_1 = \pm \frac{c_2}{c_1}(\phi - \phi_1) = \pm c(\phi - \phi_1)$$

Now if $\theta=0$ (i.e., parabola) then c=0, so we substitute this into the reflector geometry:

$$r(\phi) = r_1 \exp\left[\int_{\phi_1}^{\phi} \tan\left(\frac{s}{2}\right) ds\right]$$

We need to solve this integral:

$$\int \tan(ax)\,dx = -\frac{1}{a}\ln\cos(ax)$$

We do that, and the equation for r(φ) above becomes:

$$r(\phi) = r_1 \exp\left[2\left(\ln\left(\cos\frac{\phi_1}{2}\right) - \ln\left(\cos\frac{\phi}{2}\right)\right)\right] = r_1\left(\frac{\cos(\phi_1/2)}{\cos(\phi/2)}\right)^2$$

If $\phi_1 = 0$ then:

$$r(\phi) = r_1\left(\frac{1}{\cos(\phi/2)}\right)^2$$

Now, if $\theta = \theta_a$ (i.e., CPC), then c is still 0, so we substitute this into the reflector geometry:

$$r(\phi) = r_1 \exp\left[\int_{\phi_1}^{\phi} \tan\left(\frac{s-\theta_a}{2}\right)ds\right]$$

We need to solve this integral:

$$\int \tan(ax)\,dx = -\frac{1}{a}\ln\cos(ax)$$

We do that, and the equation for r(φ) above becomes:

$$r(\phi) = r_1 \exp\left[2\left(\ln\left(\cos\frac{\phi_1-\theta_a}{2}\right) - \ln\left(\cos\frac{\phi-\theta_a}{2}\right)\right)\right] = r_1\left(\frac{\cos((\phi_1-\theta_a)/2)}{\cos((\phi-\theta_a)/2)}\right)^2$$

If $\phi_1 = 0$ then:

$$r(\phi) = r_1\left(\frac{\cos(\theta_a/2)}{\cos((\phi-\theta_a)/2)}\right)^2$$

Conservation of Energy:

$$\frac{d\theta}{d\phi} = \pm\frac{I_{src}(\phi)}{I_{tar}(\theta)}$$

+ve=Elliptic (decreasing)
−ve=Hyperbolic (increasing)

$$\theta = \frac{c_2}{c_1}\phi = c\phi$$

With the following criteria:
Constant $I_{tar}(\theta) = c_1$
Rotationally symmetric source $$\frac{dI_{src}(\phi)}{d\phi} = 0,\ I_{src} = c_2$$

$$\int \tan(ax)\,dx = -\frac{1}{a}\ln\cos(ax)$$

Solution: c=0 (parabola) $\theta = \theta_a$ (CPC)

$$r = \frac{r_1}{\cos^k(\phi/k)}\quad k = \frac{2}{1-c}\quad r = \frac{r_1}{\cos^2(\phi/2)}\quad r = r_1\frac{\cos^2(\theta_a/2)}{\cos^2\left(\frac{\phi-\theta_a}{2}\right)}$$

Uniform intensity distribution:

$I_{tar}(\theta) = 4|[\theta_1,\theta_2]|=[0,\pi/6]\varphi\in[0,2][/3]r(\theta)=1$ Solve for the increasing solution:

$$\int_{\theta_1}^{\theta} I_{tar}(t)\,dt = 4(\theta-\theta_1) = \pm\int_{\phi_1}^{\phi} I_{src}(s)\,ds = \pm c_2(\phi-\phi_1)$$

We have assumed the source is normalized, $c_2 = 1$ and we use the −ve value so that our sign convention is held:

$$\theta = -\frac{\phi}{4}$$

Substitute into the reflector equation to find the increasing/hyperbolic solution:

$$r(\phi) = r(0)\exp\left[\int_{\phi_1}^{\phi}\tan\left(\frac{5s}{8}\right)ds\right] = \exp\left[-\frac{8}{5}\ln\cos\frac{5\phi}{8}\right] = \cos^{-8/5}\frac{5\phi}{8}$$

Where:

$$\int \tan(ax)\,dx = -\frac{1}{a}\ln\cos(ax)$$

Cartesian coordinates:

$x(\phi) = r(\phi)\sin\phi$ $y(\phi) = -r(\phi)\cos\phi$

Next, find the decreasing/elliptic solution. Note the aim function relationship:

$\theta_{elliptic}(\phi) = \theta_{hyperbolic}(\phi_1+\phi_2-\phi)$

For this example, the elliptic/decreasing aim function is:

$$\theta = \frac{\phi}{4} - \frac{\pi}{6}$$

The reflector shape is then:

$$r(\phi) = \left[\frac{\cos\left(\frac{3\phi}{8} + \frac{\pi}{12}\right)}{\cos\frac{\pi}{12}}\right]^{-8/3}$$

Figure 21:
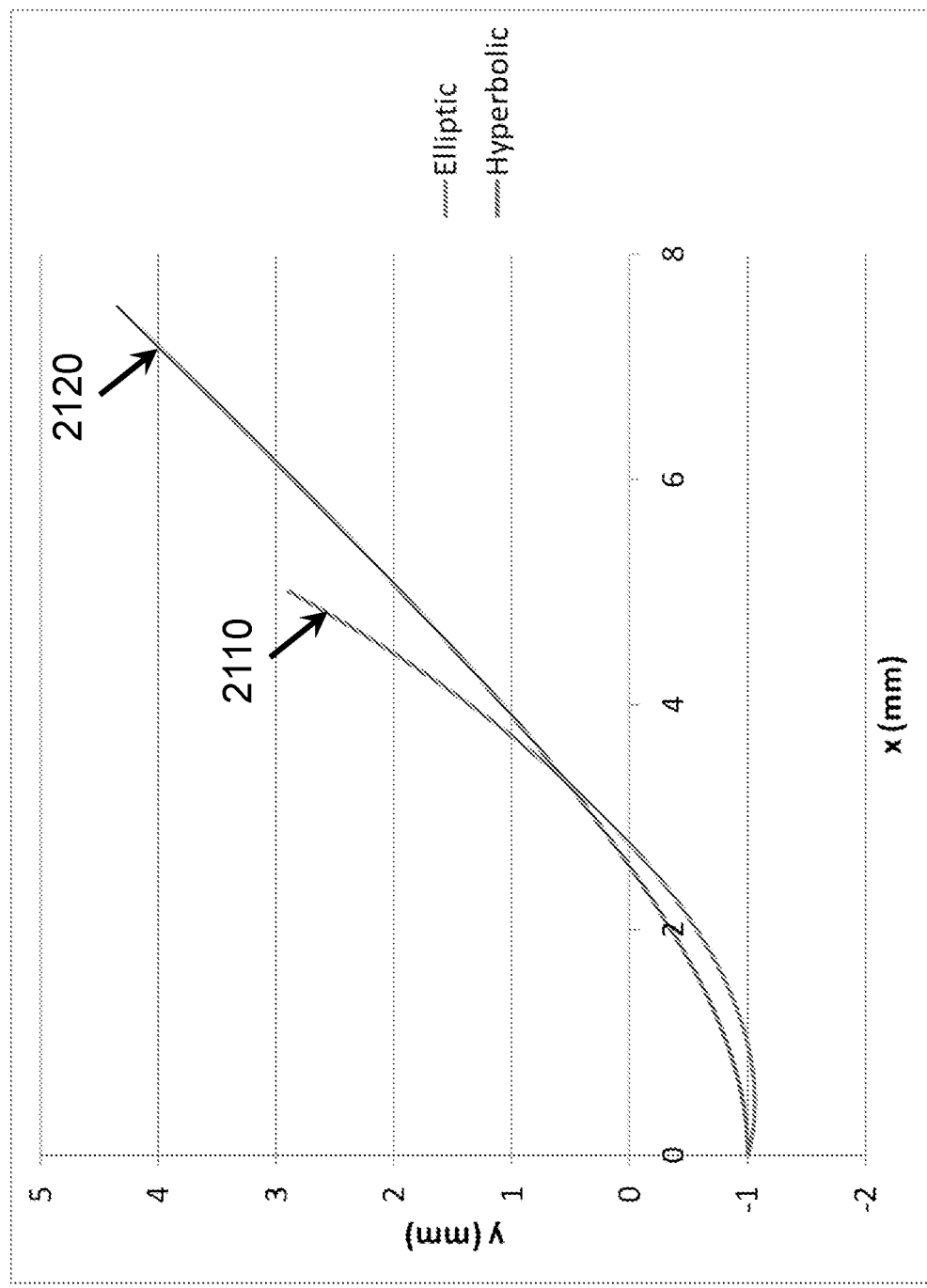
FIG. 21 illustrates example elliptic and hyperbolic profiles for a cross section of concentrators according to example embodiments of the disclosed technology.
Figure 22:
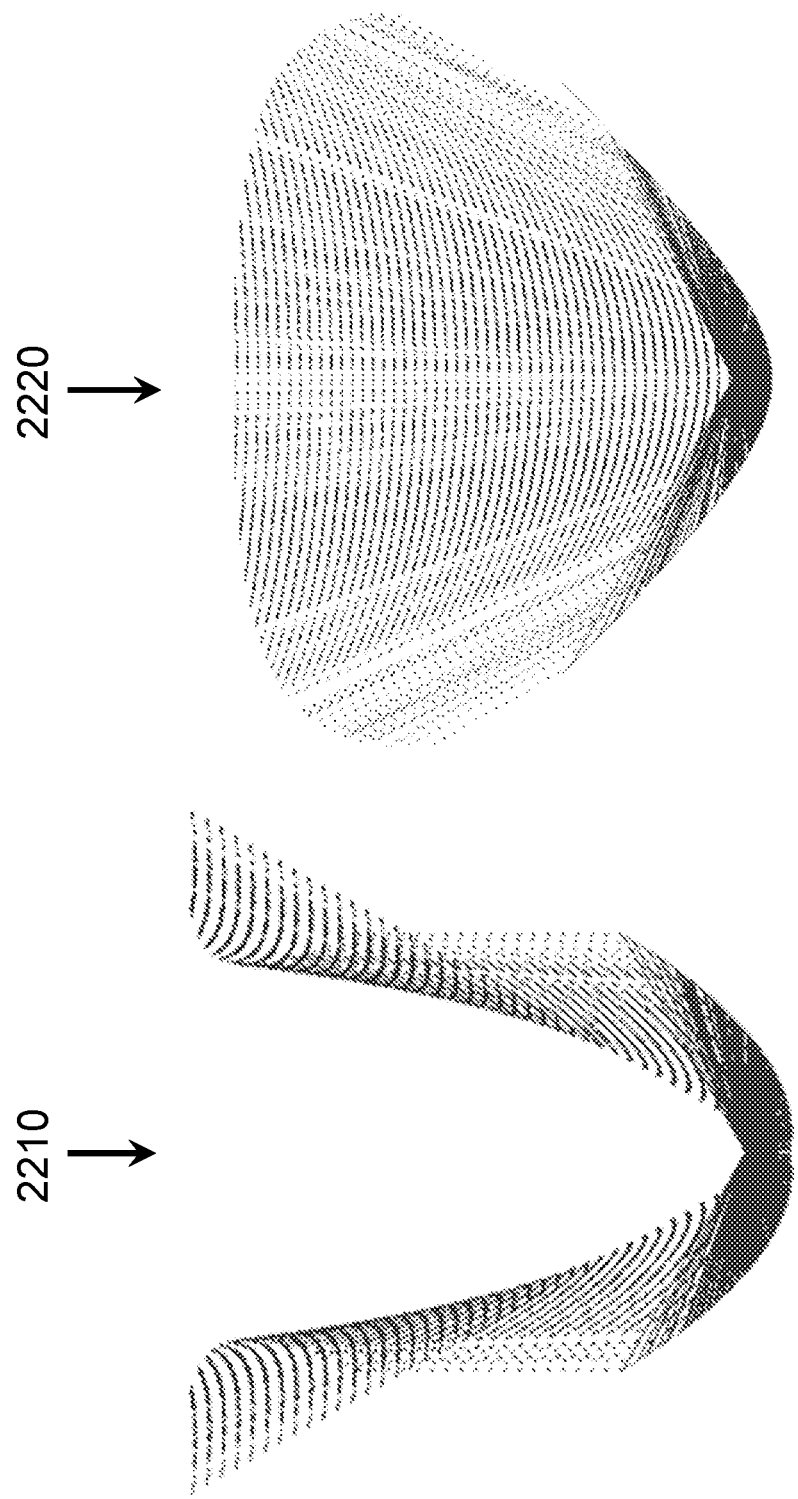
FIG. 22 illustrates example 3D shapes of elliptic and hyperbolic profiles of concentrators according to the disclosed technology.

FIG. 21 illustrates example elliptic (curve 2110) and hyperbolic (curve 2120) profiles for across section of concentrators according to example embodiments of the disclosed technology. FIG. 22 illustrates example 3D shapes of elliptic (2210) and hyperbolic (2220) profiles of concentrators according to the disclosed technology.

Figure 23:
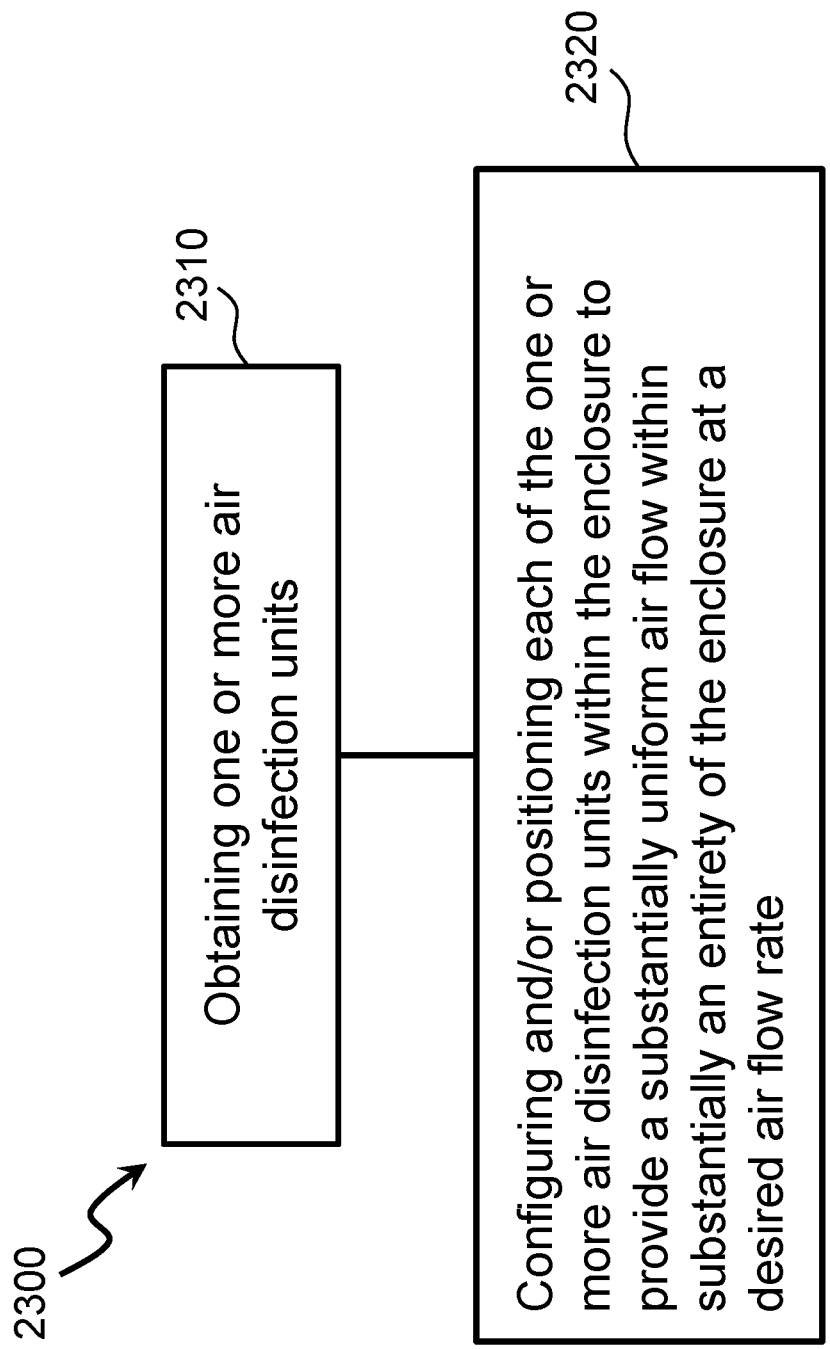
FIG. 23 shows a flow diagram of an example embodiment of a method of designing an air disinfection system for an enclosure, according to the disclosed technology.

FIG. 23 shows a flow diagram of an example embodiment of a method 2300 of designing an air disinfection system for an enclosure, according to the disclosed technology. The method 2300 includes a process 2310 of obtaining one or more air disinfection units. The method 2300 further includes a process 2320 of configuring and/or positioning each of the one or more air disinfection units within the enclosure to provide a substantially uniform air flow within substantially an entirety of the enclosure at a desired air flow rate. According to some example embodiments of the method 2300, each air disinfection unit comprises: a housing structured to include an interior volume and having an air inlet at a first end of the housing and an air outlet at a second end of the housing, the housing enabling an air flow through the interior volume between the air inlet and the air outlet; at least one light source positioned proximate to the interior volume and operable to emit radiation in an ultraviolet range of wavelengths; and at least one non-imaging optical element positioned proximate to the interior volume; wherein the at least one non-imaging optical element is configured to form an optical cavity in at least a part of the interior volume to receive the radiation from the at least one light source and to confine the radiation within the optical cavity, and one or more of a shape of the at least one non-imaging optical element, or emission profile of the radiation from the at least one light source are selected or designed to produce a substantially spatially uniform distribution of the radiation in a cross section of the optical cavity.

An aspect of the disclosed embodiments relates to a device for air disinfection, comprising: a housing structured to include an interior volume and having an air inlet at a first end of the housing and an air outlet at a second end of the housing, the housing enabling an air flow through the interior volume between the air inlet and the air outlet; at least one light source positioned proximate to the interior volume and operable to emit radiation in an ultraviolet range of wavelengths; and at least one non-imaging optical element positioned proximate to the interior volume; wherein: the at least one light source and the at least one non-imaging optical element are positioned to form an optical cavity in at least a part of the interior volume to confine the radiation within the optical cavity, and one or more of a shape of the at least one non-imaging optical element, or emission profile of the radiation from the at least one light source are selected or designed to produce a substantially spatially uniform distribution of the radiation in the optical cavity.

In some example embodiments, the device for air disinfection includes a fan operable to create the air flow in the interior volume between the first end of the housing and the second end of the housing. According to some example embodiments, the at least one light source is capable of emitting light in a spectral range around 265 nm. In certain example embodiments, the at least one non-imaging optical element includes a mirror that provides specular reflection for the ultraviolet range of wavelengths. In an example embodiment, the at least one non-imaging optical element is configured to reflect the radiation based on total internal refraction or based on diffraction. In another example embodiment, the device for air disinfection comprises two non-imaging optical elements positioned to face one another in a substantially parallel configuration, wherein the at least one light source is positioned to direct the radiation in a direction toward one of the two non-imaging optical elements. In yet another example embodiment, the device for air disinfection comprises two light sources, wherein a first light source is positioned to direct the radiation in a direction toward a first of the two non-imaging optical elements and a second light source is positioned to direct the radiation in a direction toward another one of the two non-imaging optical elements. In some example embodiments, the spatially uniform distribution of the radiation is characterized as having a substantially uniform energy density or radiance. According to certain example embodiments, a rate of the air flow and fluence of the radiation inside the optical cavity are selected to provide a predetermined radiation dose to air passing through the optical cavity high to deactivate pathogens present in the passing air. In an example embodiment, the device is a part of a heating, ventilation, or air conditioning system, and wherein the device is coupled to an air duct of the heating, ventilation, or air conditioning system to provide an air passage: (a) from the air outlet of the device to the air duct, or (b) from the air duct to the air inlet of the device. In certain example embodiments, the device is a first air disinfection unit in a system of a plurality of air disinfection units in an enclosure, and wherein the plurality of air disinfection units are collectively configured to provide a substantially uniform air flow throughout the enclosure. In some example embodiments, each of the plurality of air disinfection units has an identical structure as all other air disinfection units. According to some example embodiments, at least one of the plurality of air disinfection units is designed to produce a different air flow characteristic compared to other air disinfection units. In an example embodiment, each of the plurality of air disinfection units is positioned at a particular location within the enclosure to produce the substantially uniform air flow throughout the enclosure. In another example embodiment, each of the plurality of air disinfection units is configured to provide a corresponding airflow characteristic to produce the substantially uniform air flow throughout the enclosure. According to certain example embodiments, the device is configured to be retrofitted within the heating, ventilation, or air conditioning system and utilize an existing airflow of the heating, ventilation, or air conditioning system. In an example embodiment, the device for air disinfection comprises an air filter.

Another aspect of the disclosed embodiments relates to a method of constructing an air circulation system, including: providing a device according to the disclosed technology, wherein at least a part of the air flow in the air circulation system passes through the device between the air inlet and the air outlet of the device.

Yet another aspect of the disclosed embodiments relates to a method for designing an air disinfection system for an enclosure, comprising: obtaining dimensions of the enclosure; obtaining one or more air disinfection units, each air disinfection unit comprising: a housing structured to include an interior volume and having an air inlet at a first end of the housing and an air outlet at a second end of the housing, the housing enabling an airflow through the interior volume between the air inlet and the air outlet; at least one light source positioned proximate to the interior volume and operable to emit radiation in an ultraviolet range of wavelengths; and at least one non-imaging optical element positioned proximate to the interior volume; wherein the at least one light source and the at least one non-imaging optical element are positioned to form an optical cavity in at least a part of the interior volume to confine the radiation within the optical cavity, and one or more of a shape of the at least one non-imaging optical element, or emission profile of the radiation from the at least one light source are selected or designed to produce a substantially spatially uniform distribution of the radiation in the optical cavity; configuring and/or positioning each of the one or more air disinfection units within the room to provide a substantially uniform air flow within substantially an entirety of the enclosure at a desired air flow rate.

An aspect of the disclosed embodiments relates to a device for air disinfection, comprising: a housing structured to include an interior volume and having an air inlet at a first end of the housing and an air outlet at a second end of the housing, the housing allowing an air flowthrough the interior volume between the air inlet and the air outlet; at least one light source positioned proximate to the interior volume and operable to emit radiation in an ultraviolet range of wavelengths; and at least one non-imaging optical element positioned proximate to the interior volume; wherein: the at least one non-imaging optical element is configured to form an optical cavity in at least a part of the interior volume to confine the radiation provided by the at least one light source within the optical cavity, and one or more of a shape of the at least one non-imaging optical element, or emission profile of the radiation from the at least one light source are selected or designed to produce a substantially spatially uniform distribution of the radiation in a cross section of the optical cavity.

According to some example embodiments, the spatially uniform distribution of the radiation is characterized as having a substantially uniform flux, energy density or radiance. In some example embodiments, a rate of the airflow and fluence of the radiation inside the optical cavity are selected to provide a predetermined radiation dose to air passing through the optical cavity to deactivate pathogens present in the air passing through the optical cavity. In an example embodiment, the device is a part of a heating, ventilation, or air conditioning (HVAC) system, and wherein the device is coupled to an air duct of the HVAC system to provide an air passage: (a) from the air outlet of the device to the air duct, or (b) from the air duct to the air inlet of the device. In one example embodiment, coatings or absorbers are positioned on at least part of the air duct to absorb the radiation in the ultraviolet range of wavelengths. In another example embodiment, the device is a first air disinfection unit in a system comprising a plurality of air disinfection units in an enclosure, and wherein the plurality of air disinfection units are collectively configured to provide a substantially uniform air flow throughout the enclosure. In yet another example embodiment, each of the plurality of air disinfection units has the same structure as all other air disinfection units. According to certain example embodiments, at least one of the plurality of air disinfection units is designed to produce a different air flow characteristic or a different air disinfection characteristic compared to other air disinfection units. In some example embodiments, the plurality of air disinfection units form an array of disinfection units having disinfection units that are stacked on top of one another, are arranged in a back-to-back configuration, are arranged in a side-by-side configuration, or combinations thereof. In an example embodiment, a number of the plurality of the air disinfection units and a position of each air disinfection unit within the enclosure are selected to produce the substantially uniform air flow throughout the enclosure. In another example embodiment, the cross section of the optical cavity is a cross section produced by a plane proximate to one of: the air inlet at the first end of the housing or the air outlet at the second end of the housing, and wherein the plane is substantially perpendicular to a line between the first end of the housing and the second end of the housing. In some example embodiments, the device for air disinfection comprises one or more injectors coupled to the at least one light source and to the optical cavity to deliver the radiation to the optical cavity. According to some example embodiments, the one or more injectors are positioned at a mid-section of the optical cavity. In certain example embodiments, at least one of the injectors is configured to receive radiation from the at least one light source at an end thereof and to provide the radiation to the optical cavity from an edge thereof. In some example embodiments, the non-imaging optical element is formed as an oblong concentrator having a cross-sectional area in a mid-section thereof that is larger than cross-sections areas at either ends of the oblong concentrator, and wherein the oblong concentrator is configured to allow the radiation received from the at least one light source to undergo multiple reflections within the oblong concentrator without leaking out of the oblong concentrator, and to produce a higher concentration of reflected radiation at one or both ends of the oblong concentrator compared to the mid-section of the oblong concentrator.

Another aspect of the disclosed embodiments relates to a method of designing an air disinfection system for an enclosure, comprising: obtaining one or more air disinfection units, each air disinfection unit comprising: a housing structured to include an interior volume and having an air inlet at a first end of the housing and an air outlet at a second end of the housing, the housing enabling an air flow through the interior volume between the air inlet and the air outlet; at least one light source positioned proximate to the interior volume and operable to emit radiation in an ultraviolet range of wavelengths; and at least one non-imaging optical element positioned proximate to the interior volume; wherein the at least one non-imaging optical element is configured to form an optical cavity in at least a part of the interior volume to receive the radiation from the at least one light source and to confine the radiation within the optical cavity, and one or more of a shape of the at least one non-imaging optical element, or emission profile of the radiation from the at least one light source are selected or designed to produce a substantially spatially uniform distribution of the radiation in a cross section of the optical cavity; configuring and/or positioning each of the one or more air disinfection units within the enclosure to provide a substantially uniform air flow within substantially an entirety of the enclosure at a desired air flow rate.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. For example, the processor may be configured to receive electrical signals or information from the disclosed sensors (e.g., CMOS sensors), and to process the received information to produce images or other information of interest.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes Only a few implementations and examples are described and other implementations, enhancements and variations can be made based on what is described and illustrated in this patent document.

What is claimed is:

1. A device for air disinfection, comprising:
a housing structured to include an interior volume and having an air inlet at a first end of the housing and an air outlet at a second end of the housing, the housing allowing an air flow through the interior volume between the air inlet and the air outlet;
at least one light source positioned proximate to the interior volume and operable to emit radiation in an ultraviolet range of wavelengths; and
at least one non-imaging optical element positioned proximate to the interior volume, wherein:
the at least one non-imaging optical element is configured to form an optical cavity in at least a part of the interior volume to confine the radiation provided by the at least one light source within the optical cavity,
the at least one non-imaging optical element is formed as an oblong concentrator having a cross-sectional area in a mid-section thereof that is larger than cross-sectional areas at either ends of the oblong concentrator, wherein the oblong concentrator is configured to allow the radiation received from the at least one light source to undergo multiple reflections within the oblong concentrator without leaking out of the oblong concentrator, and to produce a higher concentration of reflected radiation at one or both ends of the oblong concentrator compared to the mid-section of the oblong concentrator, and
one or more of a shape of the at least one non-imaging optical element, or emission profile of the radiation from the at least one light source are selected or designed to produce a substantially spatially uniform distribution of the radiation in a cross section of the optical cavity.

2. The device of claim 1, comprising:
a fan operable to create the air flow in the interior volume between the first end of the housing and the second end of the housing.

3. The device of claim 1, wherein the at least one light source is capable of emitting light in a spectral range around 265 nm.

4. The device of claim 1, wherein the at least one non-imaging optical element includes a mirror that provides specular reflection for the ultraviolet range of wavelengths.

5. The device of claim 1, wherein the at least one non-imaging optical element is configured to reflect the radiation based on total internal reflection or based on diffraction.

6. The device of claim 1, comprising two non-imaging optical elements positioned to face one another in a substantially parallel configuration, wherein the at least one light source is positioned to direct the radiation in a direction toward one of the two non-imaging optical elements.

7. The device of claim 6, comprising two light sources, wherein a first light source is positioned to direct the radiation in a direction toward a first of the two non-imaging optical elements and a second light source is positioned to direct the radiation in a direction toward another one of the two non-imaging optical elements.

8. The device of claim 1, wherein the substantially spatially uniform distribution of the radiation is characterized as having a substantially uniform flux, energy density or radiance.

9. The device of claim 1, wherein a rate of the air flow and fluence of the radiation inside the optical cavity are selected to provide a predetermined radiation dose to air passing through the optical cavity to deactivate pathogens present in the air passing through the optical cavity.

10. The device of claim 1, wherein the device is a part of a heating, ventilation, or air conditioning (HVAC) system, and wherein the device is coupled to an air duct of the HVAC system to provide an air passage: (a) from the air outlet of the device to the air duct, or (b) from the air duct to the air inlet of the device.

11. The device of claim 10, further including coatings or absorbers on at least part of the air duct to absorb the radiation in the ultraviolet range of wavelengths.

12. The device of claim 1, wherein the device is a first air disinfection unit in a system comprising a plurality of air disinfection units in an enclosure, and wherein the plurality of air disinfection units are collectively configured to provide a substantially uniform air flow throughout the enclosure.

13. The device of claim 12, wherein each of the plurality of air disinfection units has the same structure as all other air disinfection units.

14. The device of claim 12, wherein at least one of the plurality of air disinfection units is designed to produce a different air flow characteristic or a different air disinfection characteristic compared to other air disinfection units.

15. The device of claim 12, wherein the plurality of air disinfection units form an array of disinfection units having disinfection units that are stacked on top of one another, are arranged in a back-to-back configuration, are arranged in a side-by-side configuration, or combinations thereof.

16. The device of claim 12, wherein a number of the plurality of air disinfection units and a position of each air disinfection unit within the enclosure are selected to produce the substantially uniform air flow throughout the enclosure.

17. The device of claim 12, wherein each of the plurality of air disinfection units is configured to provide a corresponding airflow characteristic to produce the substantially uniform air flow throughout the enclosure.

18. The device of claim 1, wherein the cross section of the optical cavity is a cross section produced by a plane proximate to one of: the air inlet at the first end of the housing or the air outlet at the second end of the housing, and wherein the plane is substantially perpendicular to a line between the first end of the housing and the second end of the housing.

19. The device of claim 1, comprising one or more injectors coupled to the at least one light source and to the optical cavity to deliver the radiation to the optical cavity.

20. The device of claim 19, wherein the one or more injectors are positioned at a mid-section of the optical cavity.

21. The device of claim 20, wherein at least one of the one or more injectors is configured to receive radiation from the at least one light source at an end thereof and to provide the radiation to the optical cavity from an edge thereof.

22. A method of designing an air disinfection system for an enclosure, comprising:
obtaining one or more air disinfection units, each air disinfection unit comprising:
a housing structured to include an interior volume and having an air inlet at a first end of the housing and an air outlet at a second end of the housing, the housing enabling an air flow through the interior volume between the air inlet and the air outlet;
at least one light source positioned proximate to the interior volume and operable to emit radiation in an ultraviolet range of wavelengths; and
at least one non-imaging optical element positioned proximate to the interior volume, wherein the at least one non-imaging optical element is configured to form an optical cavity in at least a part of the interior volume to receive the radiation from the at least one light source and to confine the radiation within the optical cavity, wherein the at least one non-imaging optical element is formed as an oblong concentrator having a cross-sectional area in a mid-section thereof that is larger than cross-sectional areas at either ends of the oblong concentrator, the oblong concentrator configured to allow the radiation received from the at least one light source to undergo multiple reflections within the oblong concentrator without leaking out of the oblong concentrator, and to produce a higher concentration of reflected radiation at one or both ends of the oblong concentrator compared to the mid-section of the oblong concentrator, and wherein one or more of a shape of the at least one non-imaging optical element, or emission profile of the radiation from the at least one light source are selected or designed to produce a substantially spatially uniform distribution of the radiation in a cross section of the optical cavity; and
configuring or positioning each of the one or more air disinfection units within the enclosure to provide a substantially uniform air flow within substantially an entirety of the enclosure at a desired air flow rate.

* * * * *